(12) United States Patent
Nishihara

(10) Patent No.: US 10,379,373 B2
(45) Date of Patent: *Aug. 13, 2019

(54) IMAGE STABILIZATION DEVICE

(71) Applicant: OLYMPUS CORPORATION, Hachioji-shi, Tokyo (JP)

(72) Inventor: Rintaro Nishihara, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,321

(22) Filed: Nov. 5, 2018

(65) Prior Publication Data

US 2019/0072779 A1    Mar. 7, 2019

Related U.S. Application Data

(63) Continuation of application No. 15/608,280, filed on May 30, 2017, now Pat. No. 10,165,184.

(30) Foreign Application Priority Data

Jul. 13, 2016  (JP) .................................. 2016-138730
Feb. 20, 2017  (JP) .................................. 2017-028776

(51) Int. Cl.
| | | |
|---|---|---|
| *G02B 27/64* | (2006.01) | |
| *H04N 5/232* | (2006.01) | |
| *H04N 5/14* | (2006.01) | |
| *H04N 5/217* | (2011.01) | |
| *G06T 7/207* | (2017.01) | |
| *G02B 7/02* | (2006.01) | |

(Continued)

(52) U.S. Cl.
CPC .......... *G02B 27/646* (2013.01); *H04N 5/144* (2013.01); *H04N 5/217* (2013.01);
(Continued)

(58) Field of Classification Search
CPC ............. G02B 27/646; H04N 5/23248; H04N 5/23277; H04N 5/23287
See application file for complete search history.

(56) References Cited

U.S. PATENT DOCUMENTS 10,165,184 B2 *  12/2018  Nishihara .......... H04N 5/23248
2006/0018643 A1 *   1/2006  Stavely .................. G03B 17/02
                                                        396/55

(Continued)

FOREIGN PATENT DOCUMENTS

JP           07005515 A      1/1995

*Primary Examiner* — Abdelaaziz Tissire
(74) *Attorney, Agent, or Firm* — Holtz, Holtz & Volek PC

(57) ABSTRACT

A position detection apparatus is configured to detect a position of a movable portion relative to a fixed portion using a voice coil motor (VCM) driving portion. The position detection apparatus includes a position detection element arranged on one of the movable portion and the fixed portion, and a first position detection magnet and a second position detection magnet arranged on another of the movable portion and the fixed portion. The first position detection magnet and the second position detection magnet are aligned so that different magnetic poles face a surface of the position detection element. The first position detection magnet and the second position detection magnet are arranged in an order in a moving direction of the movable portion such that magnitudes of densities of magnetic fluxes reaching the surface of the position detection element from the first position detection magnet and the second position detection magnet are different.

8 Claims, 14 Drawing Sheets

(51) Int. Cl.
*G02F 1/1333* (2006.01)
*G09G 3/36* (2006.01)

(52) U.S. Cl.
CPC ..... *H04N 5/23248* (2013.01); *H04N 5/23287* (2013.01); *G02B 7/023* (2013.01); *G02F 1/1333* (2013.01); *G06T 7/207* (2017.01); *G06T 2207/30241* (2013.01); *G09G 3/3607* (2013.01); *H04N 5/23277* (2013.01)

(56) References Cited

U.S. PATENT DOCUMENTS

| | | | |
|---|---|---|---|
| 2006/0269262 A1* | 11/2006 | Shin | G02B 27/646 |
| | | | 396/55 |
| 2007/0171551 A1 | 7/2007 | Tsai | |
| 2008/0088954 A1* | 4/2008 | Takahashi | G02B 7/023 |
| | | | 359/813 |
| 2010/0188760 A1 | 7/2010 | Wade et al. | |
| 2012/0154614 A1 | 6/2012 | Moriya et al. | |
| 2013/0170039 A1 | 7/2013 | Miyoshi | |
| 2014/0218798 A1 | 8/2014 | Suzuka | |
| 2014/0354860 A1 | 12/2014 | Yuge et al. | |
| 2014/0375829 A1 | 12/2014 | Nishihara et al. | |
| 2016/0070270 A1* | 3/2016 | Beard | G02B 27/646 |
| | | | 318/647 |
| 2016/0105612 A1 | 4/2016 | Yuge et al. | |
| 2016/0127647 A1* | 5/2016 | Miyoshi | H04N 5/23287 |
| | | | 348/208.4 |
| 2016/0342069 A1 | 11/2016 | Inoue | |
| 2017/0003516 A1* | 1/2017 | Kiyamura | G02B 27/646 |
| 2017/0052343 A1* | 2/2017 | Wong | G02B 7/28 |
| 2017/0176765 A1* | 6/2017 | Sueoka | G02B 7/02 |

* cited by examiner

IMAGE STABILIZATION DEVICE

CROSS REFERENCE TO RELATED APPLICATIONS

This application is a Continuation application of U.S. application Ser. No. 15/608,280, filed May 30, 2017, which is based on claims the benefit of Japanese Application No. 2016-138730, filed Jul. 13, 2016, and Japanese Application No. 2017-028776, filed Feb. 20, 2017, the contents of all of which are incorporated herein by reference.

BACKGROUND OF THE INVENTION

1. Field of the Invention

The present invention relates to an optical type image stabilization device mounted on a lens barrel fitted to an image pickup apparatus or the like and configured with a voice coil type actuator.

2. Description of the Related Art

Conventionally, image pickup apparatuses capable of subsequently converting optical images formed by an image pickup optical system to image signals using a photoelectric conversion device or the like (hereinafter referred to as an image pickup device) and recording the image signals obtained thereby into a recording medium as image data in a predetermined form, and configured being provided with an image display device such as a liquid crystal display device (LCD) and an organic EL display device for reproducing and displaying the image data recorded in the recording medium as images, for example, a digital camera and a video camera have been generally in practical use and widespread.

Among the conventional image pickup apparatuses of this type, various kinds of image pickup apparatuses have been proposed and put into practical use, which are provided with a so-called optical type image stabilization device configured to detect a slight movement of the image pickup apparatus (a so-called camera shake or the like) caused because holding of the apparatus is unstable when the image pickup apparatus is held by hands, and cause a part of optical members of the image pickup optical system to move on a plane that is almost orthogonal to an optical axis, in a direction to cancel the movement (in a shift direction) or enable pitch direction rotation and yaw direction rotation with each of two axes (an X axis and a Y axis) orthogonal to the optical axis of the image pickup optical system as a center.

As driving means in the image stabilization devices of this type, for example, driving means using a voice coil type magnetic actuator (a voice coil motor; VCM), a vibration type linear actuator is generally in practical use.

Further, in the image stabilization devices of this type, it is common that, in order to perform control for causing the part of optical members of the image pickup optical system to move, position detection means for detecting a position of a movable frame member holding the optical member caused to move at the time of image stabilization is provided. Examples of the position detection means in that case include an optical type position detection unit configured including a light projecting member and a light receiving member and a magnetic detection type position detection unit configured including a magnetism emitting member (such as a magnet) and a magnetism detecting member.

For example, a conventional image stabilization device disclosed by Japanese Patent Application Laid-Open Publication No. H7-5515 or the like is configured including driving means configured with a coil, a yoke, a magnet and the like and position detection means configured with a light projecting element, a light receiving element and the like. In the image stabilization device, the driving means and the position detection means are arranged at separate positions.

SUMMARY OF THE INVENTION

An image stabilization device of an aspect of the present invention is an image stabilization device including a movable portion including an image pickup device or an image pickup lens and a VCM driving portion configured to drive the movable portion relative to a fixed portion using a coil and a driving magnet, the image stabilization device including: a position detection element arranged on one of the movable portion and the fixed portion; and paired position detection magnets arranged at positions facing the position detection element and arranged on another of the movable portion and the fixed portion; wherein the paired position detection magnets are a first magnet and a second magnet arranged so that different magnetic poles face a surface of the position detection element; the first magnet and the second magnet are arranged in order along a direction away from an optical axis at a center of a light flux incident on the image pick device or the image pickup lens; and magnitudes of densities of magnetic fluxes reaching the surface of the position detection element from the first magnet and the second magnet, respectively, are mutually different.

Benefits of the present invention will be apparent from the following detailed description.

DETAILED DESCRIPTION OF THE PREFERRED EMBODIMENT

Figure 1:
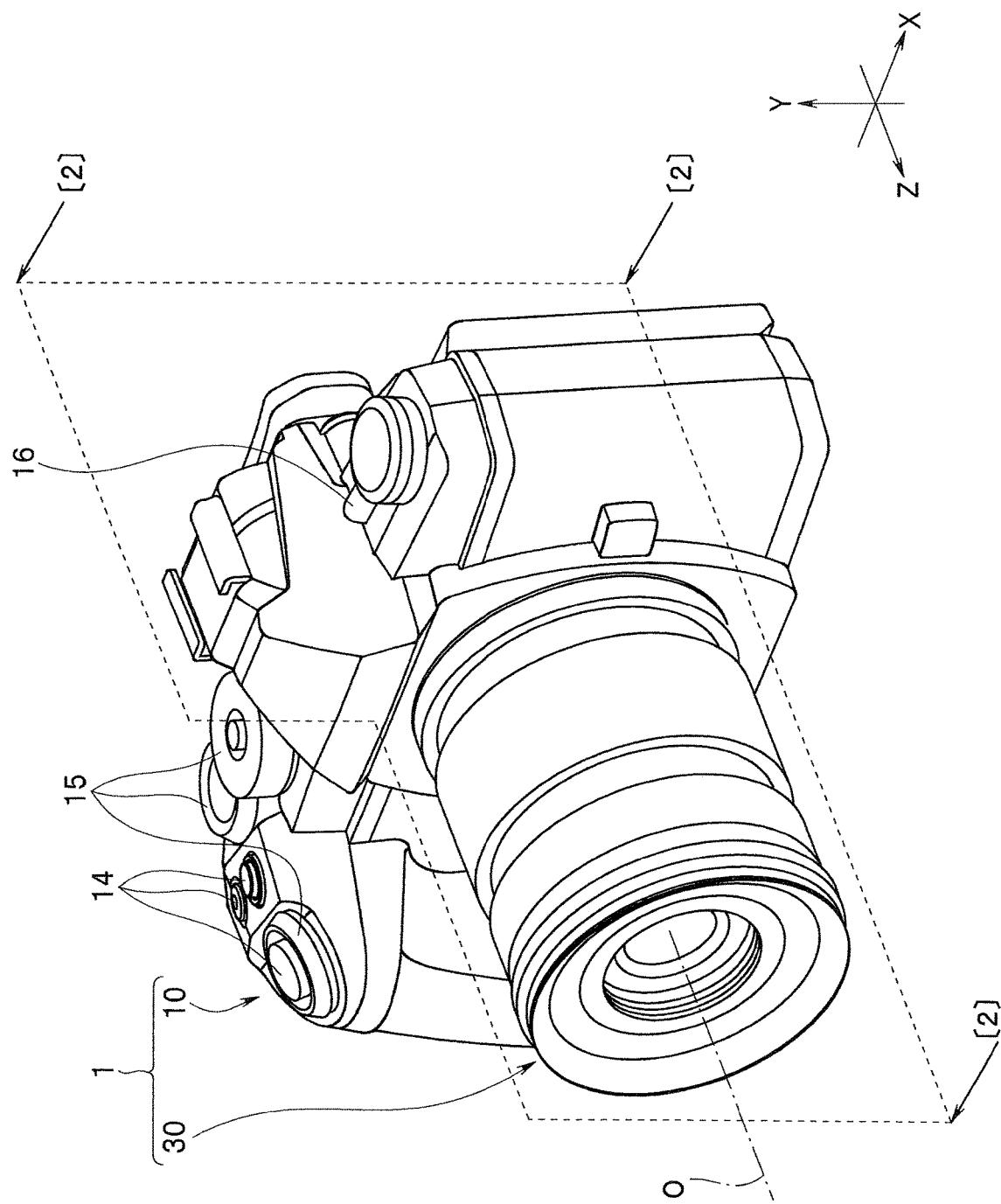
FIG. 1 is an external perspective view showing an image pickup apparatus capable of being fitted with a lens barrel on which an image stabilization device of one embodiment of the present invention is mounted.

The present invention will be described below by an embodiment shown in drawings.

One Embodiment

One embodiment of the present invention is, for example, an exemplification of an image stabilization device mounted on a lens barrel of an image pickup apparatus configured to be capable of photoelectrically converting an optical image formed by an image pickup optical system configured with a plurality of optical members (image pickup lenses) and the like using a solid-state image pickup device or the like, converting an image signal obtained by the photoelectrical conversion to digital image data indicating a still image or a movie, recording the digital image data generated by the conversion to a recording medium, and reproducing and displaying the still image or the movie on a display device based on the digital image data recorded in the recording medium.

In the present embodiment, an optical axis of the image pickup optical system in the lens barrel is indicated by reference symbol O. In a direction along the optical axis O, a side on which an object facing a front surface of the image pickup apparatus exists is referred to as a forward direction, and a side on which a light receiving surface (an image forming surface) of the image pickup device arranged on a back surface side of the image pickup apparatus exists is referred to as a backward direction. Further, a left and right direction, that is, a horizontal direction facing the front surface of the image pickup apparatus from the object side, in a plane orthogonal to the optical axis O is referred to as an X direction. Similarly, an upward and downward direction (a vertical direction) at the time of facing the front surface of the image pickup apparatus from the object side, that is, a direction vertical to the X direction described above is referred to as a Y direction. Further, the direction along the optical axis O is referred to as a Z direction.

Note that each drawing used in the description below is schematic, and a dimensional relationship, reduced scale and the like of each member may be shown different for each component in order to show the component in a recognizable size on the drawing. Therefore, as for the number of components for each component, shapes of the respective components, a ratio of sizes of the respective components, relative positional relationships among the respective components and the like shown in each drawing, the present invention is not limited to the form shown in the drawing.

Figure 2:
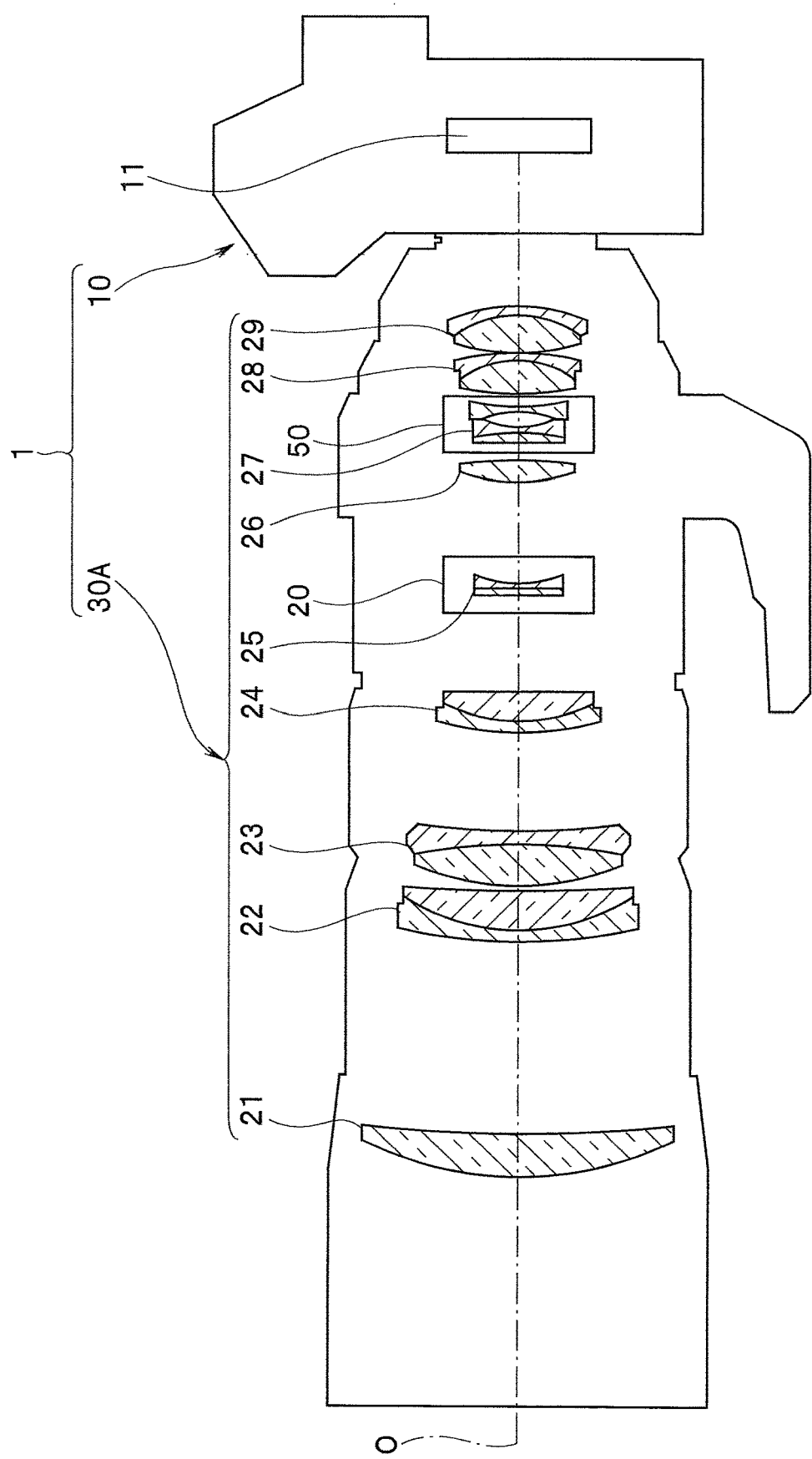
FIG. 2 shows a longitudinal section of the image pickup apparatus of FIG. 1 cut by a cutting plane shown by reference numeral [2] in FIG. 1 and is a conceptual diagram showing an outline of an internal structure of the image pickup apparatus and the lens barrel fitted to the image pickup apparatus.

FIG. 1 is an external perspective view showing an image pickup apparatus capable of being fitted with a lens barrel on which the image stabilization device of the one embodiment of the present invention is mounted. FIG. 2 shows a longitudinal section of the image pickup apparatus of FIG. 1 cut by a cutting plane shown by reference numeral [2] in FIG. 1 and is a conceptual diagram showing an outline of an internal structure of the image pickup apparatus and the lens barrel fitted on the image pickup apparatus. Note that, in FIG. 2, in order to avoid complication of the drawing, component members that are not directly related to the present invention are omitted, and an internal configuration is shown being simplified. Note that the respective lens barrels shown in FIGS. 1 and 2 are of different types.

That is, an image pickup apparatus 1 shown in FIGS. 1 and 2 is a so-called lens interchangeable image pickup apparatus that is configured to be capable of selecting one of a plurality of lens barrels of different types (indicated by reference numeral 30 in FIG. 1, reference numeral 30A in FIG. 2 and the like) and fitting the lens barrel to a common apparatus body 10.

Both of the respective lens barrels (30 and 30A) shown in FIGS. 1 and 2 can be thought to be mounted with an image stabilization device 50 of the present embodiment (to be described in detail later). In description of the present embodiment below, the image stabilization device 50 (see FIG. 2) mounted on the lens barrel 30A shown in FIG. 2 will be exemplified.

First, prior to describing a detailed configuration of the image stabilization device 50 of the one embodiment of the present invention, a schematic configuration of the image pickup apparatus 1 provided with the lens barrel 30A to be mounted with the image stabilization device 50 will be described with reference to FIGS. 1 and 2.

As shown in FIGS. 1 and 2, the image pickup apparatus 1 is configured with the apparatus body 10 and the lens barrel (30, 30A). Between the components, the apparatus body 10 is configured including a case that internally accommodates various kinds of component units constituting the image pickup apparatus 1 and a plurality of operation members and the like each of which is arranged at a predetermined position on an outer surface of the case.

The various kinds of component units accommodated in the case of the apparatus body 10, include, for example, a finder device, a shutter mechanism, and a plurality of electrical boards which are not shown, in addition to an image pickup device 11 (not shown in FIG. 1; see FIG. 2). Here, as the image pickup device 11, for example, a CCD image sensor using a CCD (charge coupled device) or an MOS type image sensor using a CMOS (complementary metal oxide semiconductor) is applied.

Further, to the shutter mechanism, for example, a not-shown focal plane type shutter mechanism provided on a front surface side of a light receiving surface of the image pickup device 11 is applied. Note that, as for the shutter mechanism, a so-called lens shutter mechanism or the like in a form of being arranged inside the lens barrel 30 may be applied, in addition to the shutter mechanism in the form of being arranged inside the apparatus body 10.

As another component unit included in the apparatus body 10, a display device (not shown) is arranged on a back surface side of the case. The display device is configured including a display panel or the like configured to display an image based on image data acquired by the image pickup device 11 or image data recorded in a recorded medium not shown and display a selection display screen and the like for making various kinds of settings.

Furthermore, as the plurality of operation members provided on an exterior of the case, for example, a push type operation member 14 for performing shutter release, change of each setting and the like, a rotary type operation member 15 for performing a setting switching operation, a mode selection operation and the like, a lever type operation member 16 for performing an on/off operation of a power source, and the like as well as a sliding type operation member and the like for performing other operations, as shown in FIG. 1.

On the other hand, the lens barrel (30, 30A) provided in the image pickup apparatus 1 is formed, for example, in a cylindrical shape as a whole and configured internally including the image stabilization device 50 of the present embodiment (see FIG. 2) and the like, in addition to an image pickup optical system configured with a plurality of image pickup lens groups (21 to 29; see FIG. 2) and the like, which are a plurality of optical members, a plurality of lens holding members (not shown) holding the plurality of image pickup lens groups constituting the image pickup optical system, respectively, a unit including a predetermined image pickup lens group (reference numeral 25) and a holding member holding the image pickup lens group (not shown), a focus unit 20 configured with a driving mechanism (not shown) and the like for causing the above unit to move forward and backward in a direction along the optical axis O, and the like.

The lens barrel (30, 30A) is arranged on a front surface side of the apparatus body 10. In this case, the lens barrel (30, 30A) may be in a form of being fixed to the apparatus body 10 or may be in a form of being freely attachable to and detachable from the apparatus body 10.

Here, a configuration is made in which, when the lens barrel (30, 30A) enters a state of being arranged on the front surface of the apparatus body 10, an optical image formed by the image pickup optical system of the lens barrel (30, 30A) is formed on the light receiving surface of the image pickup device 11 in the apparatus body 10. Therefore, arrangement of the lens barrel (30, 30A) relative to the apparatus body 10 is specified so that the optical axis O of the image pickup optical system of the lens barrel (30, 30A) substantially corresponds to a substantially central portion of the light receiving surface of the image pickup device 11.

The image stabilization device 50 of the present embodiment is configured including a lens holding frame (not shown in FIG. 2) holding a seventh lens group 27, which is a predetermined image pickup lens group among the plurality of image pickup lens groups (21 to 29) constituting the image pickup optical system of the lens barrel 30A shown in FIG. 2. The image stabilization device 50 is an assembly (a unit) configured to perform image stabilization by causing a movable portion 51 that includes the seventh lens holding frame holding the seventh lens group 27 to move within the plane orthogonal to the optical axis O (details will be described later).

As for other components of the image pickup apparatus 1 itself, further detailed description will be omitted, on the assumption that the components are almost similar to those of a conventional image pickup apparatus in the same form.

Next, a detailed configuration of the image stabilization device 50 of the present embodiment will be described below with reference to FIGS. 3 to 10.

Figure 3:
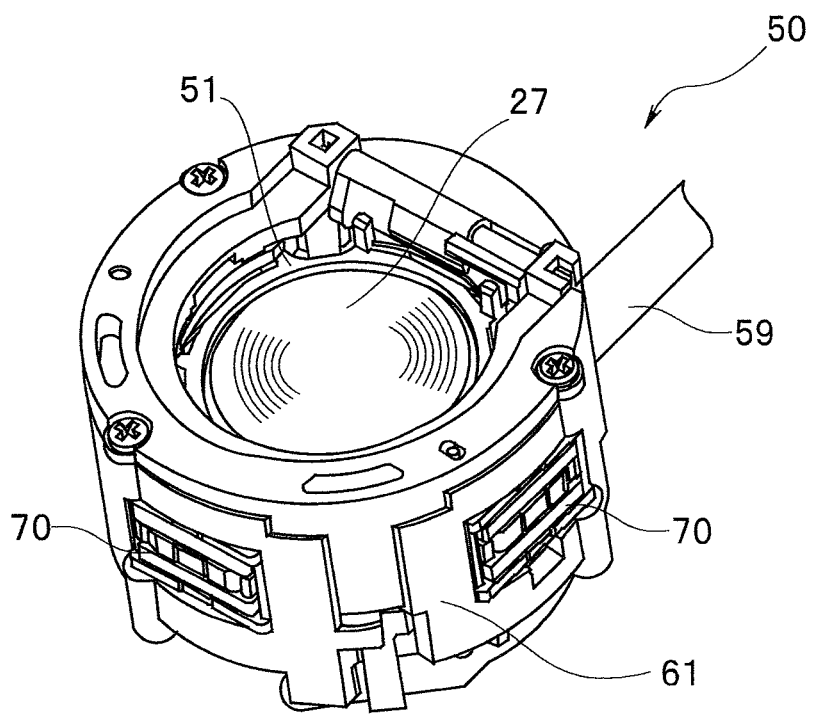
FIG. 3 is an external perspective view of the image stabilization device of the one embodiment of the present invention.
Figure 4:
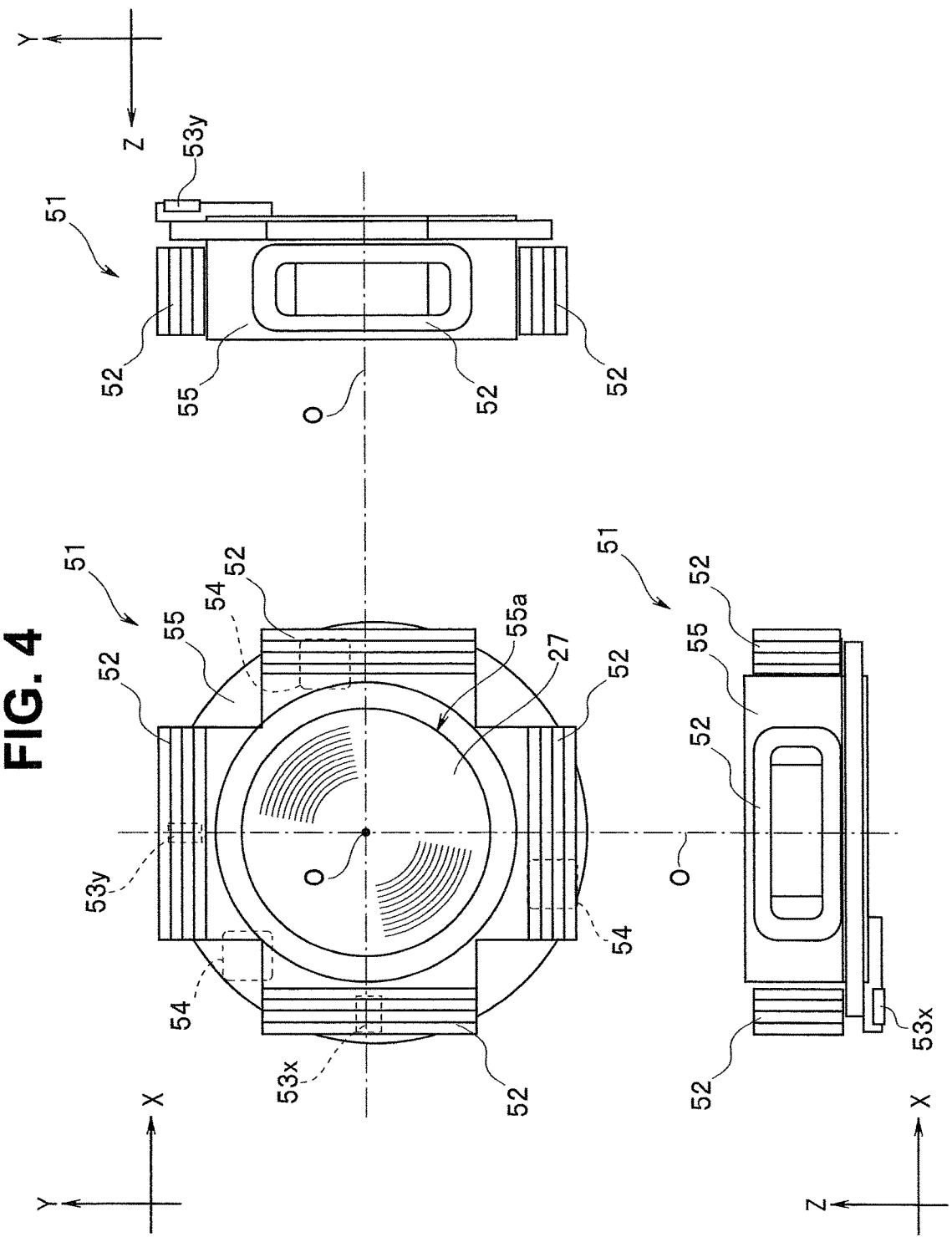
FIG. 4 shows three views (a front view, a right side view and a bottom view) of a movable portion of the image stabilization device of the one embodiment of the present invention.
Figure 5:
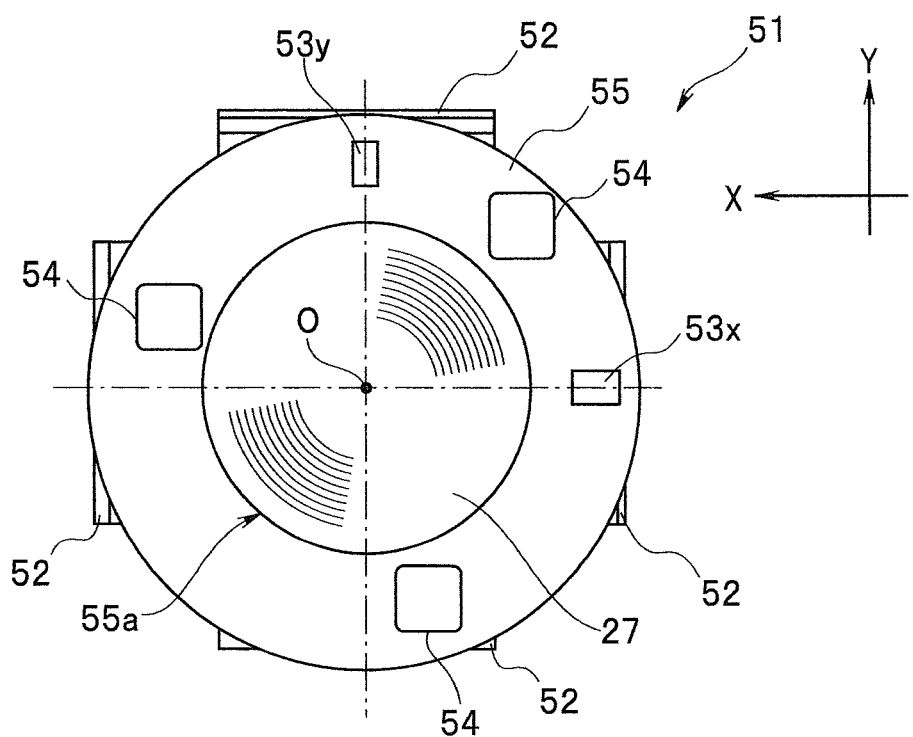
FIG. 5 is a rear view of the movable portion of the stabilization device of the one embodiment of the present invention.
Figure 6:
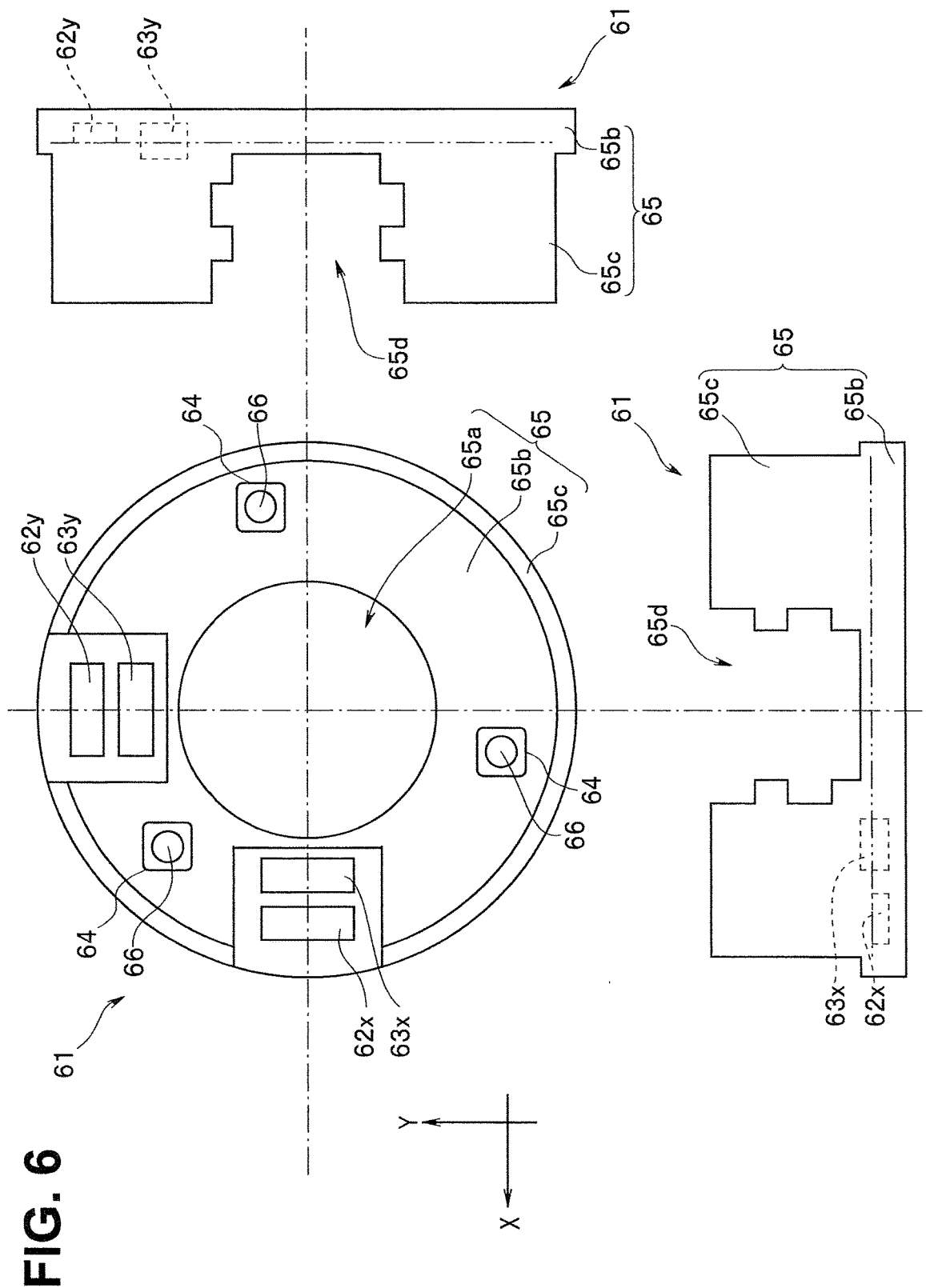
FIG. 6 shows three views (a front view, a right side view and a bottom view) of a fixed portion of the image stabilization device of the one embodiment of the present invention.
Figure 7:
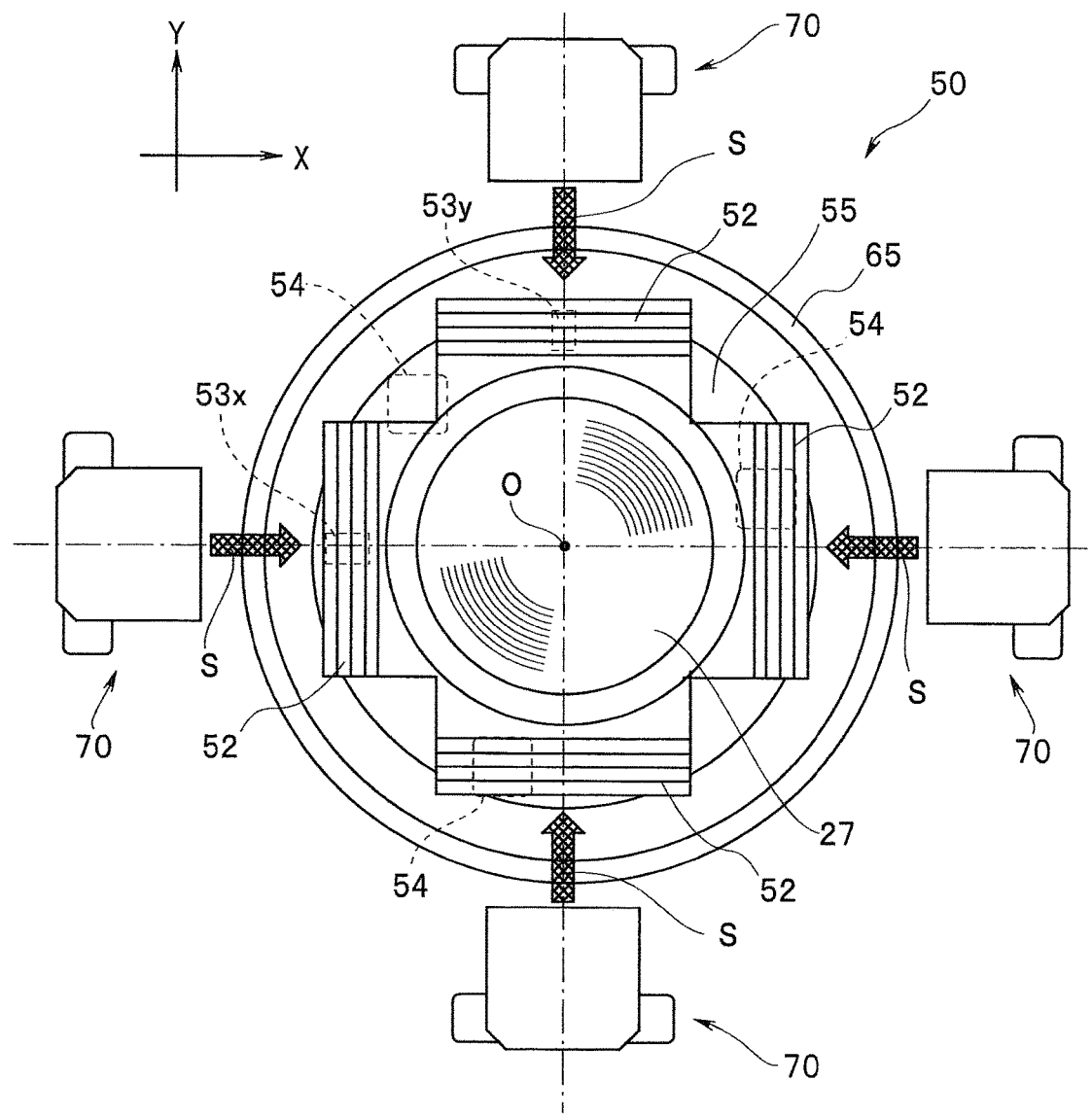
FIG. 7 is a front view of the image stabilization device of the one embodiment of the present invention (a state in which a magnetic circuit unit has been removed from the image stabilization device)
Figure 8:
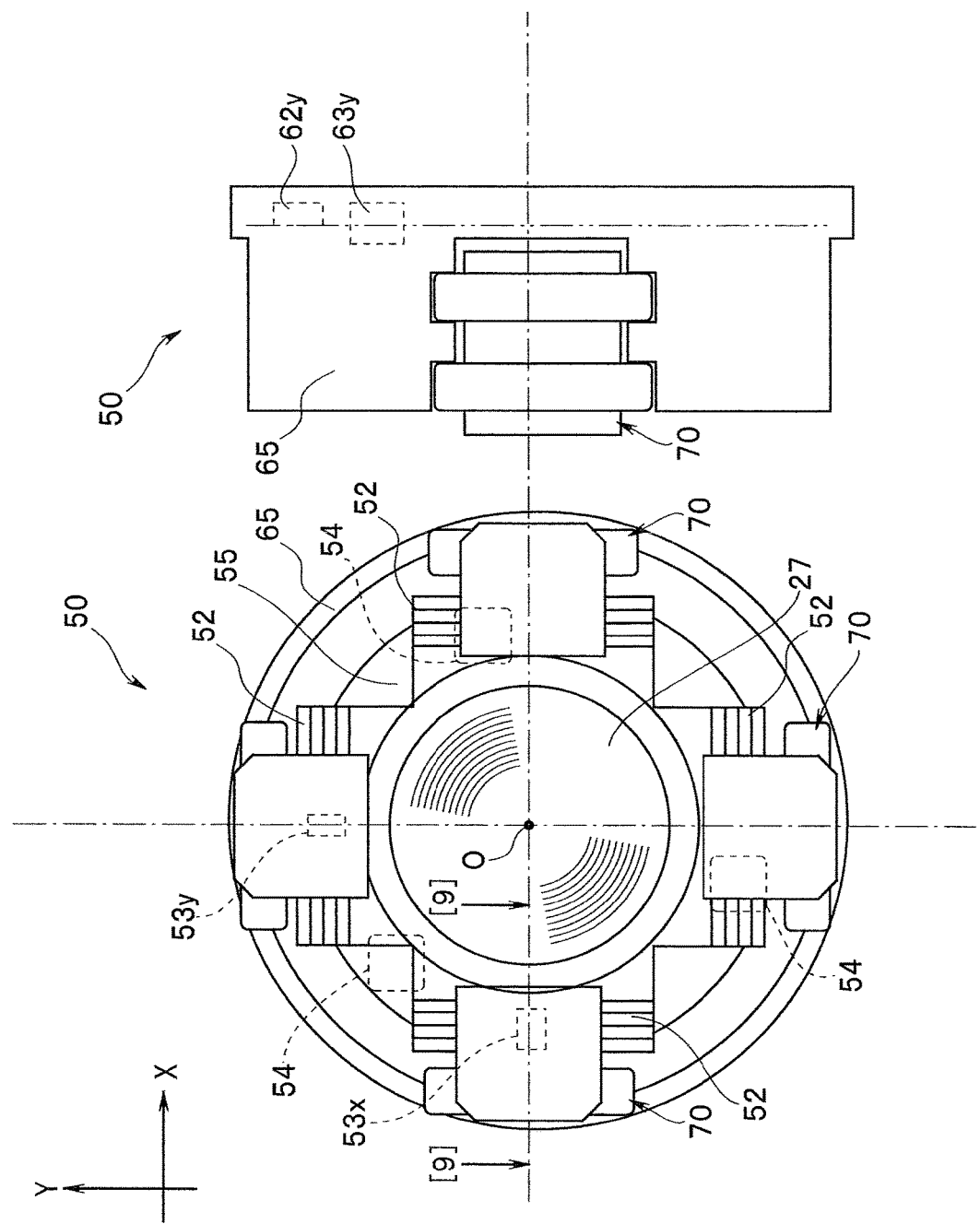
FIG. 8 shows a front view and a right side view of the image stabilization device of the one embodiment of the present invention (a state in which the magnetic circuit unit has been incorporated in the state of FIG. 7)
Figure 9:
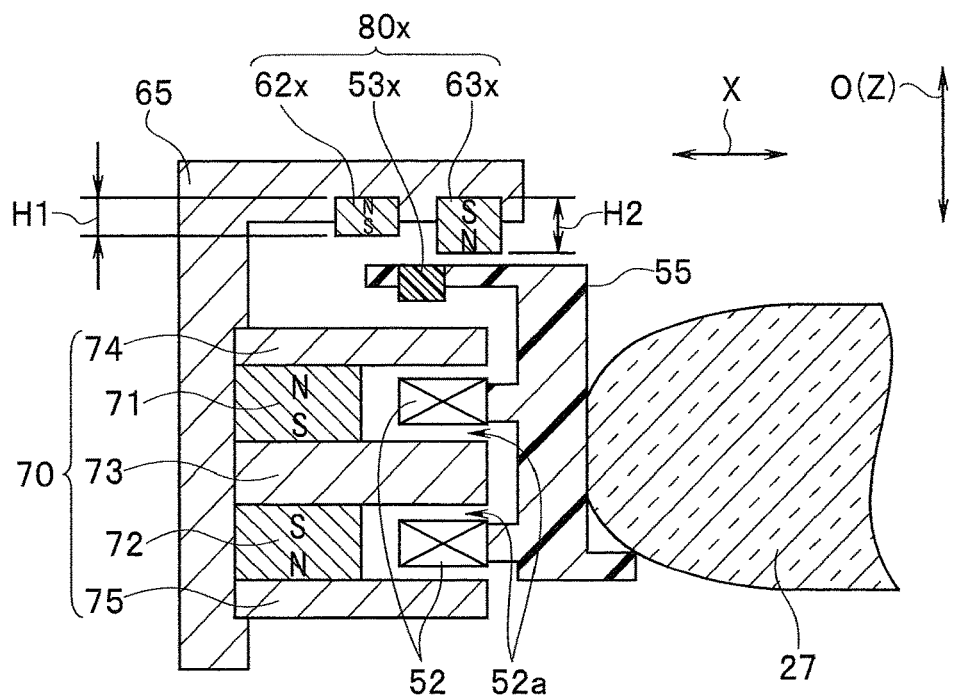
FIG. 9 is a cross-sectional view along a [9]-[9] line in FIG. 8.
Figure 10:
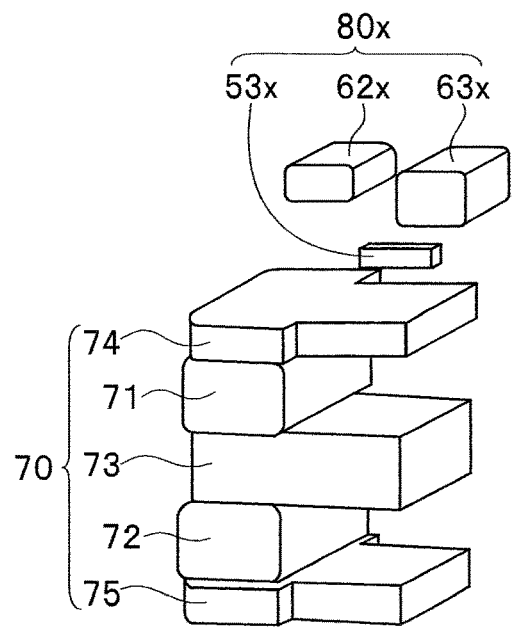
FIG. 10 is a perspective exploded view of main portions in which the magnetic circuit unit and a position detection unit of the image stabilization device of the one embodiment of the present invention are taken out and shown.

FIG. 3 is an external perspective view of the image stabilization device of the one embodiment of the present invention. FIG. 4 shows three views (a front view, a right side view and a bottom view) of the movable portion of the image stabilization device of the present embodiment. FIG. 5 is a rear view of the movable portion of the image stabilization device of the present embodiment. FIG. 6 shows three views (a front view, a right side view and a bottom view) of a fixed portion of the image stabilization device of the present embodiment. FIG. 7 is a front view of the image stabilization device of the present embodiment. Note that FIG. 7 shows a state in which a magnetic circuit unit has been removed from the image stabilization device. FIG. 8 shows a front view and a right side view of the image stabilization device of the present embodiment. Note that FIG. 8 shows a state in which the magnetic circuit unit has been incorporated in the state of FIG. 7. FIG. 9 is a cross-sectional view along a [9]-[9] line in FIG. 8. FIG. 10 is a perspective exploded view of main portions in which the magnetic circuit unit and a position detection unit of the image stabilization device of the present embodiment are taken out and shown.

The image stabilization device 50 of the one embodiment of the present invention is an assembly (a unit) configured to perform image stabilization by causing the movable portion 51 that includes the seventh lens holding frame holding the seventh lens group 27 to move within the plane orthogonal to the optical axis O as described above.

As shown in FIG. 3 and the like, the image stabilization device 50 of the present embodiment is configured mainly with the movable portion 51, a fixed portion 61, a VCM driving portion (driving means using a magnetic actuator) including a magnetic circuit units 70, a flexible printed wiring board 59 and the like.

The movable portion 51 is a component portion that includes the seventh lens holding frame holding the seventh lens group 27 among the plurality of image pickup lens groups (21 to 29) constituting the image pickup optical system in the lens barrel 30A.

The movable portion 51 is held inside the fixed portion 61 and is configured to move relative to the fixed portion 61 within the plane orthogonal to the optical axis O of a light beam incident on the optical member (the seventh lens group 27). By this configuration, the image stabilization device 50 of the present embodiment performs control to cause the movable portion 51 to be driven relative to the fixed portion 61 in a direction of canceling an image shake based on a predetermined image stabilization signal to obtain an image stabilization effect. A basic configuration for the above is almost similar to that of a conventional image stabilization device. A configuration of the movable portion 51 will be briefly described below.

Mainly as shown in FIGS. 4, 5 and the like, the movable portion 51 is configured with a movable portion body 55 which is a basic component portion and is the seventh lens holding frame, and a plurality of component members each of which is arranged at a predetermined position on the movable portion body 55, that is, a plurality of driving coils 52, hall elements (53x and 53y; to be described in detail later), the seventh lens group 27 and the like.

The movable portion body 55 is configured with an annular flat plate member as a whole, and an opening 55a is formed on a substantially central part. The seventh lens group 27, which is a part of the optical members constituting the image pickup optical system, is fixed in the opening 55a.

On one face (a front side) near an outer peripheral edge portion of the movable portion body 55, the plurality of (four) driving coils 52 for driving the movable portion 51, and the hall elements (53x and 53y), which are a plurality of (two) position detection elements constituting a part of the position detection unit, which is position detection means for detecting a position of the movable portion 51 in the X and Y directions with the optical axis O as a center, are arranged at predetermined positions, respectively.

The four driving coils 52 are arranged at angle intervals of 90 degrees in a diameter direction with the optical axis O as a center, in a manner of surrounding the opening 55a (that is, the seventh lens group 27) of the movable portion body 55. At this time, an air core portion of each driving coil 52 is arranged so as to face a direction orthogonal to the optical axis O. The respective driving coils 52 are fixed to the movable portion body 55, being arranged facing a plurality of driving magnets 71, 72 that are included in the magnetic circuit units 70 (to be described in detail later) provided on the fixed portion 61 when the image stabilization device 50 is in an assembled state.

Note that, among the respective driving coils 52, coils facing each other, sandwiching the opening 55a are connected in series via the flexible printed wiring board 59 (see FIG. 3).

The plurality of (two) hall elements (53x, 53y) for position detection are arranged at predetermined positions, respectively, on the fixed portion 61, the positions facing a plurality of position detection magnets (62x, 63x, 62y, 63y) constituting another part of the position detection unit which is the position detection means, respectively (details will be described later).

That is, the magnetic detection type position detection unit is configured with the plurality of hall elements (53x, 53y) and the plurality of position detection magnets (62x, 63x, 62y, 63y).

In this case, an X-direction position detection unit 80x (see FIG. 9) is configured with one hall element 53x and a pair of position detection magnets 62x, 63x. Similarly, a Y-direction position detection unit is configured with one hall element 53y and a pair of position detection magnets 62y, 63y.

Here, the hall element 53x is a position detection element configured to detect an X-direction position of the movable portion 51 in the plane orthogonal to the optical axis O. Further, the hall element 53y is a position detection element configured to detect a Y-direction position of the movable portion 51 in the plane orthogonal to the optical axis O. A reference position of the movable portion 51 in this case is, for example, a position based on the optical axis O.

Power supply and signal output to each of the hall elements (53x, 53y) are performed via the flexible printed wiring board 59 (see FIG. 3). Each of the hall elements (53x, 53y) is arranged so as to be oriented so that strength of a magnetic flux in the Z direction, that is, in the direction along the optical axis O can be detected.

Further, on a back (a face on an opposite side of the face where the coils are arranged) side of the movable portion body 55, a plurality of (three) ball receiving surfaces 54 are formed at predetermined positions on a peripheral edge area of the opening 55a. The ball receiving surfaces 54 are flat portions for receiving balls 66 arranged on a plurality of (three) ball receiving portions 64 of the fixed portion 61. In the present embodiment, an example is shown in which the three ball receiving surfaces 54 are formed on the back of the movable portion body 55 at angle intervals of about 120 degrees in a circumferential direction.

Note that, between the movable portion body 55 and a fixed portion body 65 (to be described later), for example, coil-shaped contractive energizing springs (not shown) are extended tensionally. Three such energizing springs are formed at angle intervals of about 120 degrees in the circumferential direction of the movable portion body 55. By this configuration, the movable portion body 55 is energized relative to the fixed portion body 65 via the balls 66. Therefore, the movable portion body 55 is configured so as to be capable of smoothly moving relative to the fixed portion body 65 within a predetermined plane (the plane orthogonal to the optical axis O).

Next, the fixed portion 61 is a component unit configured to accommodate the movable portion 51 in a state of being movable within the plane orthogonal to the optical axis O as mainly shown in FIG. 6. A basic configuration of the fixed portion 61 for this purpose is almost similar to the configuration of a conventional image stabilization device. A configuration of the fixed portion 61 will be briefly described below.

The fixed portion 61 is configured with the fixed portion body 65 which is a basic component portion, a plurality of component members each of which is arranged at a predetermined position on the fixed portion body 65, that is, the plurality of (four) magnetic circuit units 70 each of which includes the driving magnets 71, 72, the balls 66 and the like.

The fixed portion body 65 is a case unit configured with an annular flat plate portion 65b with an opening 65a formed in a substantially central part, and a cylindrical portion 65c formed to surround a peripheral edge of the flat plate portion 65b. Inside the fixed portion body 65, the movable portion body 55 is accommodated and arranged in a manner of being capable of freely moving in a predetermined direction as described above.

On the cylindrical portion 65c of the fixed portion body 65, a plurality of notch portions 65d for mounting the magnetic circuit units 70 (to be described in detail later). Four notch portions 65d are formed around the optical axis O at angle intervals of 90 degrees in a circumferential direction of the cylindrical portion 65c.

When the movable portion 51 is accommodated and arranged inside the fixed portion body 65, the seventh lens group 27 is arranged in the opening 65a facing the opening 65a. At this time, arrangement of the movable portion 51 relative to the fixed portion 61 is set so that the optical axis O of the seventh lens group 27 passes through a substantially central point of the opening 65a. That is, the opening 65a is an opening causing a light flux transmitted through the seventh lens group 27 to pass through.

Further, on one face (on a front side; a face facing the movable portion body 55) of the flat plate portion 65b of the fixed portion body 65, the plurality of (three) ball receiving portions 64 are formed. In the present embodiment, an example is shown in which the three ball receiving portions 64 are formed on the flat plate portion 65b of the fixed portion body 65 at angle intervals of about 120 degrees in a circumferential direction (see FIG. 6).

The balls 66 are accommodated and arranged in the ball receiving portions 64. Here, as the balls 66, for example, rigid spheres such as metallic balls such as steel balls, and ceramic balls are applied. Further, a depth dimension of the ball receiving portions 64 is set to be at least smaller than a diameter of the balls 66. That is, when being accommodated inside the ball receiving portions 64, the balls 66 are in a state of partially projecting from top faces of the ball receiving portions 64.

Furthermore, on the flat plate portion 65b of the fixed portion body 65, a plurality of position detection magnets are arranged at respective predetermined positions on the same face where the ball receiving portions 64 are arranged.

In the present embodiment, the plurality of position detection magnets are the pair of position detection magnets 62x, 63x corresponding to the hall element 53x for X-direction position detection and the pair of position detection magnets 62y, 63y corresponding to the hall element 53y for Y-direction position detection.

Here, the pair of position detection magnets 62x, 63x in the X direction is arranged at a position facing the hall element 53x in the X direction when the movable portion 51 and the fixed portion 61 are assembled in a normal state. The paired position detection magnets 62x, 63x are arranged so that mutually different magnetic poles face the surface of the hall element 53x. The paired position detection magnets 62x, 63x are arranged in order in a direction away from the optical axis O, side by side in a diameter direction. Between the paired position detection magnets 62x, 63x, the position detection magnet 62x arranged on an outer circumferential side is referred to as a first position detection magnet (a first magnet), and the position detection magnet 63x arranged on an inner circumferential side is referred to as a second position detection magnet (a second magnet). Therefore, the paired position detection magnets 62x (the first magnet) and 63x (the second magnet) are arranged in order along the direction away from the optical axis O.

The paired position detection magnets 62y, 63y in the Y direction are similarly arranged side by side in the diameter direction. That is, the position detection magnet 62y arranged on the outer circumferential side is referred to as the first position detection magnet (the first magnet), and the position detection magnet 63y arranged on the inner circumferential side is referred to as the second position detection magnet (the second magnet).

A configuration is made such that magnitudes of densities of magnetic fluxes reaching the surfaces of the hall elements (53x, 53y) from the first position detection magnets (62x, 62y) and the second position detection magnets (63x, 63y), respectively, are mutually different.

For example, as the second position detection magnets 63x, 63y arranged on the inner circumferential side, magnets with a larger magnetic force than the first position detection magnets 62x, 62y arranged on the outer circumferential side are used. This is because of the following reason.

That is, between the pair of position detection magnets 62x, 63x and the pair of position detection magnets 62y, 63y, a magnetic pole direction of the second position detection magnets 63x, 63y arranged on the inner circumferential side is set so that the magnetic force is cancelled by magnetic force (flux density) of the driving magnets 71, 72 included in the magnetic circuit units 70 in comparison with the first position detection magnets 62x, 62y arranged on the outer circumferential side. In consideration of the above, in the image stabilization device 50 of the present embodiment, magnets with large magnetic force are used for the second position detection magnets (63x, 63y) the magnetic pole direction of which is such that the magnetic force is cancelled by the magnetic force of the driving magnets 71, 72. By this configuration, influence of the magnetic force from the driving magnets 71, 72 is cancelled so that a higher position detection accuracy is secured (details will be described later).

Further, for example, all of the first position detection magnets 62x, 62y and the second position detection magnets 63x, 63y are formed in rectangular parallelepiped shapes that are different only in length in the direction along the optical axis O. In this case, magnets with a shorter length are used for the first position detection magnets 62x, 62y than for the second position detection magnets 63x, 63y.

In other words,
when optical axis direction length of the first position detection magnets 62x, 62y is indicated by reference symbol H1, and
optical axis direction length of the second position detection magnets 63x, 63y is indicated by reference symbol H2 (see FIG. 9),
the configuration is made such that $$H1<H2$$

is satisfied. Further, in this case, when $$H2/H1=H$$

is satisfied, it is desirable to make setting so that $$1<H\leq2$$

is satisfied.

On the other hand, the magnetic circuit units 70 are arranged in the respective plurality of (four) notch portions 65d, being inserted in directions shown by arrows S in FIG. 7. In this state, the magnetic circuit units 70 are adheringly fixed to the fixed portion body 65 of the fixed portion 61.

Each of the magnetic circuit units 70 is configured mainly with the plurality of (two) driving magnets 71, 72 and a plurality of (three) yokes 73, 74, 75 mainly as shown in FIGS. 9 and 10. Here, one of the two driving magnets 71, 72 is referred to as a first driving magnet 71, and the other is referred to as a second driving magnet 72. Further, all of the plurality of (three) yokes 73, 74, 75 are magnetic bodies. The yokes 73, 74 and 75 are referred to as a first magnetic body, a second magnetic body and a third magnetic body, respectively.

The magnets 71, 72 and the yokes 73, 74, 75 are assembled being alternately combined. Thereby, a section of the assembly is formed to be in a substantially E shape as a whole, as shown in FIG. 9. That is, specifically, for example, the two driving magnets 71, 72 are arranged sandwiching one end of the first yoke 73. In this case, magnetic poles of the two driving magnets 71, 72 are arranged so that same magnetic poles face each other sandwiching the first yoke 73. One face of the first driving magnet 71 is arranged on one end of the second yoke 74, and one face of the second driving magnet 72 is arranged on one end of the third yoke 75. The magnetic circuit units 70 assembled as described above are inserted into the notch portions 65d of the fixed portion body 65 in the directions of the arrows S in FIG. 7, as described above. A configuration is made so that, when the fixed portion 61 in a state in which each magnetic circuit unit 70 is arranged in each notch portion 65d, and the movable portion 51 are assembled in the normal state, the magnetic circuit units 70 are arranged facing the driving coils 52 of the movable portion 51, respectively (see FIG. 9). At this time, the first yokes 73 of the magnetic circuit units 70 are inserted so as to pass through air core portions 52a of the driving coils 52 of the movable portion 51 (see FIG. 9).

Note that the four driving coils 52 and the four magnetic circuit units 70 described above constitute the VCM driving portion configured to drive the movable portion 51 relative to the fixed portion 61 to perform image stabilization driving, in the image stabilization device 50 of the present embodiment.

Other components in the image stabilization device 50 of the present embodiment configured as described above are almost similar to those of a conventional image stabilization device.

In the image stabilization device 50 of the present embodiment as described above, the two driving magnets (71, 72) included in each magnetic circuit unit 70 of the VCM driving portion and the plurality of position detection magnets (62x, 63x, 62y, 63y) are arranged at mutually close positions, as described above and especially as shown in FIG. 9 and the like.

To specifically explain it, for example, in the example shown in FIG. 9, the pair of position detection magnets 62x, 63x corresponding to the hall element 53x for X-direction position detection and the two driving magnets 71, 72 included in the magnetic circuit unit 70 are arranged at mutually close positions. Further, a positional relationship between the pair of position detection magnets 62y, 63y corresponding to the hall element 53y for Y-direction position detection and the two driving magnets 71, 72 of the magnetic circuit unit 70 is almost similar (see FIG. 8 and the like).

When such a configuration is adopted, magnetic force of the driving magnets 71, 72 may leak outside, for example, through the air core portions 52a of the driving coils 52 and influence the paired position detection magnets (62x, 63x and 62y, 63y) arranged near the driving magnets (see FIG. 9). In this case, among the paired position detection magnets (62x, 63x and 62y, 63y), the second position detection magnets 63x, 63y, which are position detection magnets with magnetic poles that repel the driving magnets 71, 72 facing the driving magnets 71, 72 (that is, the position detection magnets arranged on the inner circumferential side), may be influenced more by the magnetic force that has leaked from the part. As a result, a necessary position detection accuracy cannot be obtained sometimes.

Therefore, in the present embodiment, as a device for obtaining a required position detection accuracy more certainly, a configuration is made in which magnetic force (magnetic flux density) of one of the paired position detection magnets 62x, 63x, that is, the second position detection magnet 63x which is a position detection magnet arranged with a magnet pole that faces (repels) the driving magnets 71, 72 (a position detection magnet which is arranged on the inner circumferential side) is larger than the magnetic force of the first position detection magnet 62x, which is a position detection magnet arranged with magnetic poles in the same direction as the driving magnets 71, 72 (a position detection magnet which is arranged on the outer circumferential side).

Figure 11:
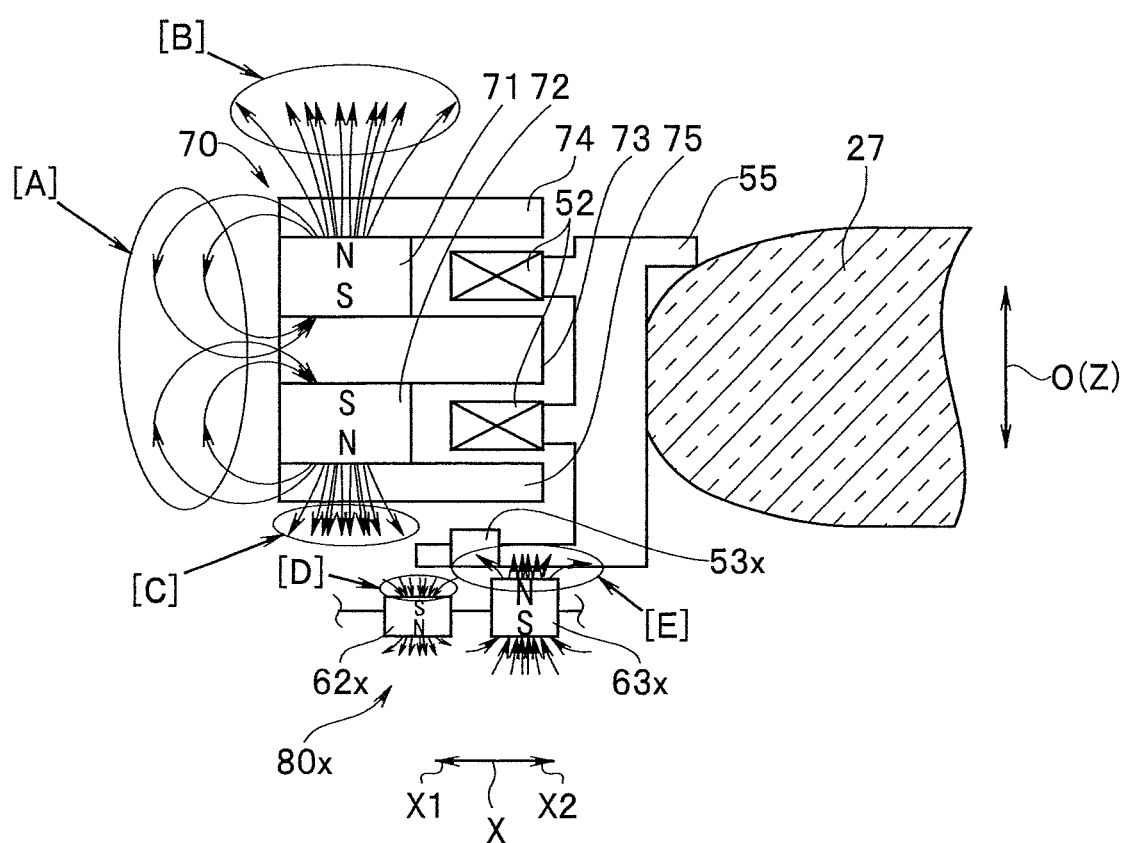
FIG. 11 is a diagram showing the configuration of the image stabilization device shown in FIG. 10, which is further simplified, and illustrating a cause of change in a magnetic flux that enters a hall element accompanying movement of the movable portion.

Here, FIG. 11 is a diagram showing the configuration of the image stabilization device shown in FIG. 10, which is further simplified, and illustrating a cause of change in a magnetic flux that enters a hall element accompanying movement of the movable portion. Note that FIG. 11 shows the state shown in FIG. 10 reversed upside down. Further, reference numerals given to the respective members and hatching are omitted in order to avoid complicatedness of the drawing and clearly show lines of magnetic force. The reference numerals and hatching are assumed to correspond to the reference numerals and hatching in FIG. 9.

Figure 12:
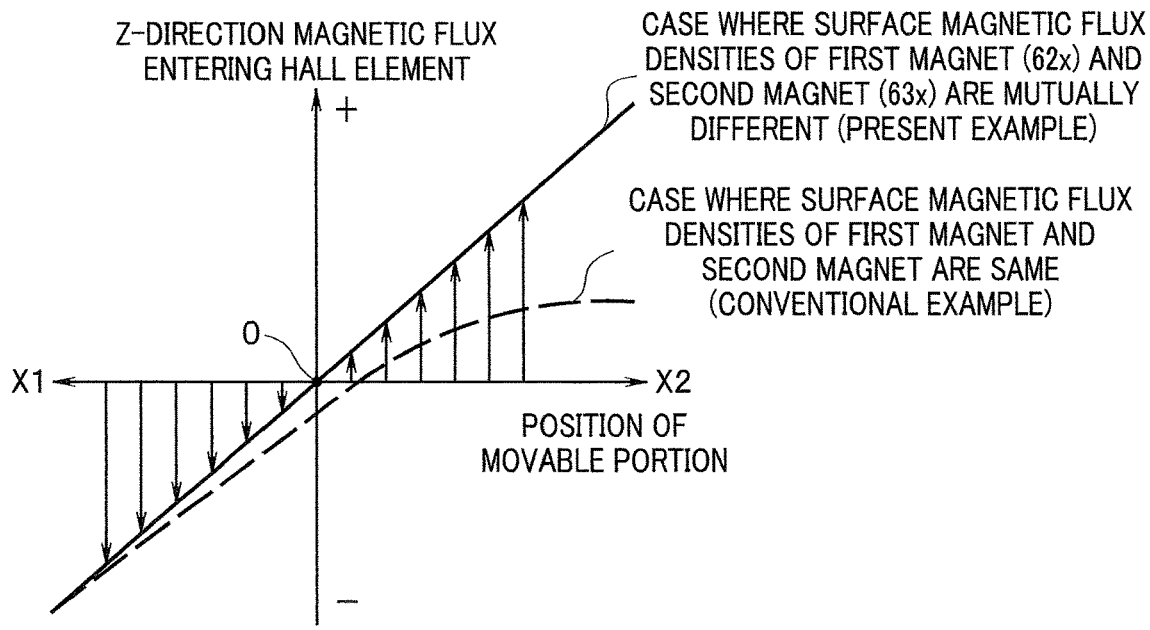
FIG. 12 is a graph comparing change in a magnetic flux that enters each hall element relative to a movement distance of the movable portion, between the image stabilization device of the one embodiment of the present invention and an image stabilization device with a conventional configuration.

FIG. 12 is a graph comparing change in a magnetic flux that enters each hall element relative to a movement distance of the movable portion, between the image stabilization device of the one embodiment of the present invention and an image stabilization device with a conventional configuration.

Magnetic forces of the respective magnetic poles of the driving magnets 71, 72 included in magnetic circuit unit 70 of the image stabilization device of the present embodiment can be shown by lines of magnetic forces indicated by reference numerals A, B and C in FIG. 11. Among the magnetic forces A, B and C, the magnetic force A is absorbed by the yoke 73. Therefore, the magnetic force A is not influenced by the position detection unit 80x (the hall element 53x).

Further, since the magnetic force B is positioned sufficiently far away from the position detection unit 80x (the hall element 53x) and faces an opposite direction of the position where the position detection unit 80x exists, it is not necessary to consider influence of the magnetic force B.

The magnetic force C enters the first magnet 62x arranged with the magnetic poles in the same direction as the driving magnets 71, 72 and enters the hall element 53x of the position detection unit 80x being combined with magnetic force of the first magnet 62x (see reference numeral D). This influences the position detection accuracy.

On the other hand, the magnetic force C is weakened by magnetic force (see reference numeral E) of the second magnet 63x arranged with a magnetic pole that faces (repels) the driving magnets 71, 72 and enters the hall element 53x of the position detection unit 80x. This influences the position detection accuracy.

Here, the hall element 53x is attached to the movable portion body 55 configured to move in a direction of an arrow X shown in FIG. 11. Thereby, the hall element 53x also moves in the same direction (the arrow X direction). By receiving magnetic fluxes from the first (position detection) magnet 62x and the second (position detection) magnet 63x during a process of the movement, position detection is performed.

That is, it is assumed that, when the movable portion body 55 (the hall element 53x) is at a reference position, a Z-direction magnetic flux that enters the hall element 53x is zero as shown in FIG. 12. Here, the reference position refers to a position where a Z-direction magnetic flux entering the hall element 53x is plus or minus zero (±0). As described above, the magnetic pole of the first magnet 62x and the magnetic pole of the second magnet 63x are arranged to face opposite directions. Therefore, when the movable portion body 55 (the hall element 53x) is positioned at the reference position, the magnetic flux of the first magnet 62x and the magnetic flux of the second magnet 63x cancel each other, and, therefore, the Z-direction magnetic flux entering the hall element 53x is plus or minus zero.

When the movable portion body 55 (the hall element 53x) moves in a direction of an arrow X1 in FIG. 11 from the reference position, the Z-direction magnetic flux entering the hall element 53x receives a magnetic flux in a minus direction as shown in FIG. 12. At this time, the more the position of the hall element 53x moves in the arrow X1 direction in FIGS. 11 and 12 (the farther the position is away from the reference position), the larger the magnetic flux entering the hall element 53x is.

On the other hand, when the movable portion body 55 (the hall element 53x) moves in a direction of an arrow X2 in FIG. 11 from the reference position described above, the Z-direction magnetic flux entering the hall element 53x receives a magnetic flux in a plus direction as shown in FIG. 12. At this time, the more the position of the hall element 53x moves in the arrow X2 direction in FIGS. 11 and 12 (the farther the position is away from the reference position), the larger the magnetic flux entering the hall element 53x is.

In this case, in the configuration of the image stabilization device of the present embodiment, the magnetic force (the magnetic flux density) of one of the paired the pair of position detection magnets (62x, 63x), that is, the second magnet 63x (which is a magnet arranged with a magnet pole facing (repelling) the driving magnets 71, 72) is larger than the magnetic force (the magnetic flux density) of the first position detection magnet 62x (a position detection magnet arranged with magnetic poles in the same direction as the driving magnets 71, 72).

Therefore, by this configuration, when the movable portion body 55 (the hall element 53x) moves in the arrow X1 direction, the hall element 53x receives magnetic force corresponding to the magnetic force C+the magnetic force D. On the other hand, when the movable portion body 55 (the hall element 53x) moves in the arrow X2 direction, the hall element 53x receives magnetic force corresponding to the magnetic force E-the magnetic force C.

Here, in the configuration of the image stabilization device of the present embodiment, the magnetic forces (the magnetic flux densities) of the paired position detection magnets (62x, 63x) is set so that the following is satisfied:

(magnetic force C+magnetic force D)≈(magnetic force E−magnetic force C)

Note that, though description has been made on the X-direction position detection unit (80x) as an example in the above description, a quite similar configuration is also adopted for the Y-direction position detection unit.

By adopting such a configuration, it is possible to, in the image stabilization device 50 of the present embodiment, make a configuration so that change in a magnetic flux entering each of the hall elements (53x, 53y) is linear relative to the movement distance of the movable portion 51 as shown by a solid line in FIG. 12. Thus, thereby, it is possible to secure a high position detection accuracy in the image stabilization device 50 of the present embodiment.

Note that a broken line shown in FIG. 12 indicates change in a magnetic flux entering each of the hall elements (53x, 53y) relative to the movement distance of the movable portion 51, for example, in a case where a configuration is made using the paired position detection magnets 62x, 63x having equal magnetic forces. In this case, the paired position detection magnets 62x, 63x are influenced by the driving magnets 71, 72, and change in the magnetic flux to each of the hall elements (53x, 53y) relative to the movement of the movable portion 51 is nonlinear. Therefore, it is not possible to perform accurate position detection.

As described above, the image stabilization device 50 of the one embodiment described above is an image stabilization device 50 including the movable portion 51 configured including a predetermined image pickup lens group (the seventh lens group 27) among the plurality of image pickup lens groups, and the VCM driving portion configured to drive the movable portion 51 relative to the fixed portion 61 by using the driving coils 52 and the driving magnets 71, 72. The image stabilization device 50 is provided with the position detection elements (53x, 53y) arranged on the movable portion 51, and the pair of position detection magnets 62x, 63x and the pair of position detection magnets 62y, 63y which are arranged on the movable portion 51, at respective positions facing the position detection elements (53x, 53y), respectively.

Here, each of the pair of position detection magnets 62x, 63x and the pair of position detection magnets 62y, 63y are arranged so that different magnet poles face surfaces of the position detection elements (53x, 53y), respectively. In this case, the position detection magnet 62x, one of the paired position detection magnets 62x, 63x, is a first magnet. Further the position detection magnet 63x, the other of the paired position detection magnets 62x, 63x, is a second magnet. Similarly, the position detection magnet 62y, one of the paired position detection magnets 62y, 63y, is a first magnet. Further, the other position detection magnet 63y is a second magnet.

In this case, the first and second magnets are arranged in order along the direction away from the optical axis O which is at a center of a light flux incident on the image pickup lens group (27). A configuration is made such that magnitudes of densities of magnetic fluxes reaching the surfaces of the position detection elements (53x, 53y) from the respective first and second magnets are mutually different.

For example, the second magnet with a larger magnetic force than the magnetic force of the first magnet is applied. Further, as the first and second magnets, such rectangular-parallelepiped-shaped magnets that are different only in length in the direction along the optical axis O are applied.

More specifically, in the case of the present embodiment, a size of the first magnets (the first position detection magnets 62x, 62y) is approximately set to length 5 mm×width 1.5 mm×optical axis direction thickness 0.8 mm. In comparison, a size of the second magnets (the second position detection magnets 63x, 63y) is approximately set to length 5 mm×width 1.5 mm×optical axis direction thickness 1.2 mm.

That is, as described above, the length (thickness dimension: 1.2 mm) of the second magnets (63x, 63y) in the direction along the optical axis O is set longer than the length (thickness dimension: 0.8 mm) of the first magnets (62x, 62y) in the direction along the optical axis O so that the magnetic force of the second magnets (63x, 63y) is set to be larger than the magnetic force of the first magnets (62x, 62y), and distances from the surfaces of the position detection elements (53x, 53y) are mutually different.

By such a configuration, it is possible to, according to the image stabilization device 50 of the one embodiment described above, cause change in the magnetic flux entering each of the hall elements (53x, 53y) to be linear relative to the movement distance of the movable portion 51. Therefore, it is possible to cancel influence of the magnetic force from the driving magnets 71, 72 and secure a higher position detection accuracy.

Note that, though a configuration is made in which the movable portion 51 having the image pickup lens group (27) is provided with the driving coils 52, and the fixed portion 61 is provided with the driving magnets 71, 72 (the magnetic circuit units 70) as a form of the image stabilization device in the one embodiment described above, the form of the image stabilization device is not limited to the configuration example.

For example, a configuration is also possible in which the movable portion 51 is provided with the magnetic circuit units 70 each of which includes the driving magnets 71, 72, and the fixed portion 61 is provided with the driving coils 52.

Further, though the image stabilization device is exemplified as an optical image stabilization device in the form of causing the image pickup lens group (27) to move within the plane orthogonal to the optical axis O in the one embodiment described above, the form of the image stabilization device to which the present invention is applied is not limited to the form. For example, the present invention is also applied quite similarly to an image stabilization device in a form of being provided with the image pickup device 11 on the movable portion 51 and causing the image pickup device 11 to move within the plane orthogonal to the optical axis O.

MODIFICATIONS

In the one embodiment described above, it is assumed that sizes of densities of magnetic fluxes reaching surfaces of position detection elements from first magnets and second magnets, respectively, are mutually different. As a specific example, a configuration is shown in which rectangular-parallelepiped-shaped first magnets and second magnets that are different only in length in the direction along the optical axis are used so that magnetic force of the second magnets is larger than magnetic force of the first magnets. A configuration example different from the form shown in the one embodiment described above will be described below.

First Modification

Figure 13:
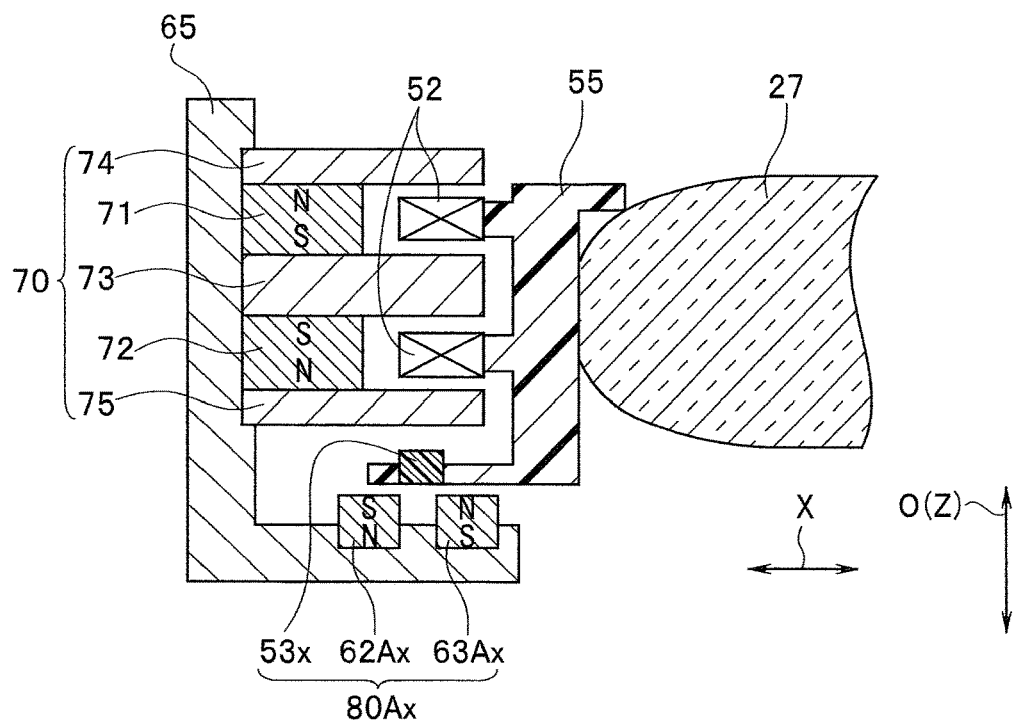
FIG. 13 is a cross-sectional view of enlarged main portions showing a first modification of the image stabilization device of the one embodiment of the present invention.

FIG. 13 is a cross-sectional view of enlarged main portions showing a first modification of the image stabilization device of the one embodiment of the present invention. FIG. 13 corresponds to FIG. 9 in the one embodiment described above. Therefore, only an X-direction position detection unit (80Ax) is shown in FIG. 13, and a Y-direction position detection unit is omitted on the assumption that the Y-direction position detection unit is configured substantially similarly to the X-direction position detection unit. In the description below, only the X-direction position detection unit (80Ax) will be described.

In the first modification, the X-direction position detection unit 80Ax is configured with paired position detection magnets 62Ax, 63Ax and the hall element 53*x*. The paired position detection magnets 62Ax, 63Ax (referred to as a first magnet 62Ax and a second magnet 63Ax) between the above are formed in the same shape (for example, a rectangular parallelepiped shape), almost in the same size and with the use of different magnetic materials.

More specifically, in the case of the present modification, for example, a magnet with residual magnetic flux density Br=approximately 0.8 [T] is used for the first magnet 62Ax, and a magnet with residual magnetic flux density Br=approximately 1.3 [T] is used for the second magnet 63Ax. Thus, a configuration is made such that magnetic force of the second magnet 63Ax is larger than magnetic force of the first magnet 62Ax. Therefore, the configuration is made such that magnitudes of densities of magnetic fluxes reaching the surface of the hall element 53*x* (a position detection element) from the respective magnets (62Ax, 63Ax) are mutually different. Even when such a configuration is adopted, an advantageous effect similar to the advantageous effect of the one embodiment described above can be obtained.

Second Modification

Figure 14:
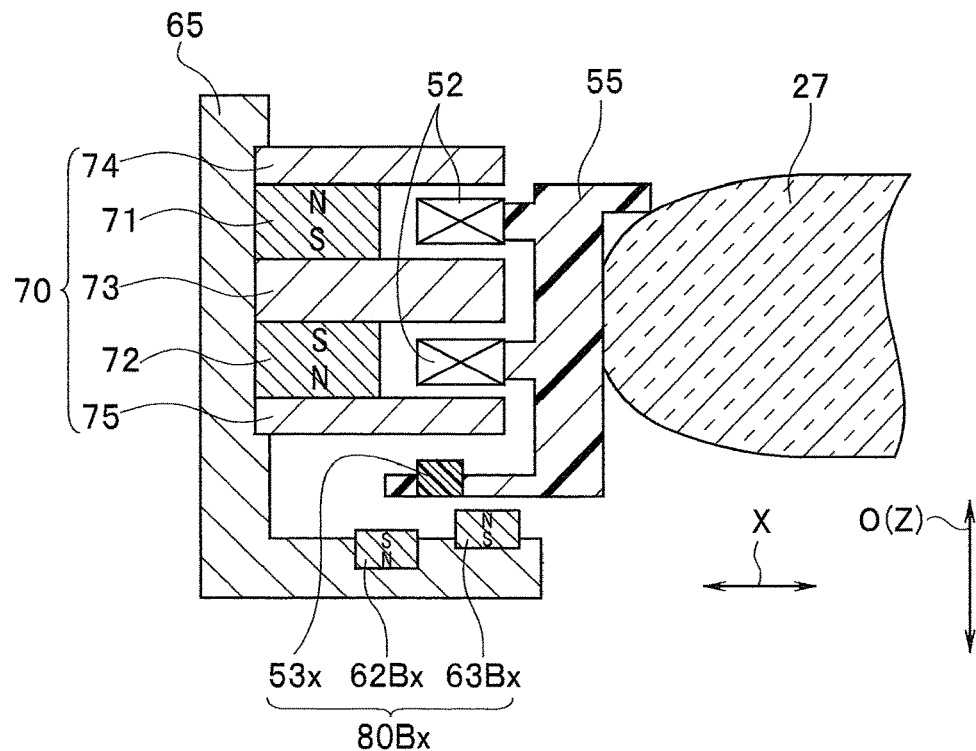
FIG. 14 is a cross-sectional view of enlarged main portions showing a second modification of the image stabilization device of the one embodiment of the present invention.

FIG. 14 is a cross-sectional view of enlarged main portions showing a second modification of the image stabilization device of the one embodiment of the present invention. FIG. 14 also corresponds to FIG. 9 in the one embodiment described above. Further, in FIG. 14 also, only an X-direction position detection unit (80Bx) is shown, and a Y-direction position detection unit is omitted on the assumption that the Y-direction position detection unit is configured substantially similarly to the X-direction position detection unit. In the description below, only the X-direction position detection unit (80Bx) will be described.

In the second modification, the X-direction position detection unit 80Bx is configured with paired position detection magnets 62Bx, 63Bx and the hall element 53*x*. The paired position detection magnets 62Bx, 63Bx (referred to as a first magnet 62Bx and a second magnet 63Bx) between the above are formed in the same shape (for example, in a rectangular parallelepiped shape) and almost in the same size. More specifically, in the case of the present modification, for example, magnets in the same size (for example, length 5 mm×width 1.5 mm×optical axis direction thickness 1.2 mm) are used for the first magnet 62Bx and the second magnet 63Bx. The paired position detection magnets 62Bx, 63Bx are arranged at positions in the direction along the optical axis O (the Z-axis direction) caused to be mutually different. That is, the first magnet 62Bx, one of the paired position detection magnets, is arranged so that a distance to the surface of the hall element 53*x* is longer than the distance of the second magnet 63Bx, the other position detection magnet. That is, in the configuration of the present modification, the first magnet 62Bx and the second magnet 63Bx are arranged by causing positions in the direction along the optical axis O to be mutually different. More specifically, the first magnet 62Bx is arranged so that the distance to the surface of the position detection element (53*x*) is longer than the distance of the second magnet 63Bx. Therefore, the configuration is made such that magnetic force of the second magnet 63Bx is larger than magnetic force of the first magnet 62Bx, and, therefore, the configuration is made such that strengths of densities of magnetic fluxes reaching the surface of the hall element 53*x* from the respective magnets are mutually different. By such a configuration, the magnitudes of densities of magnetic fluxes reaching the surface of the position detection element (53*x*) from the respective magnets are caused to be mutually different.

Even when such a configuration is adopted, an advantageous effect similar to the advantageous effect of the one embodiment described above can be obtained.

Third Modification

Figure 15:
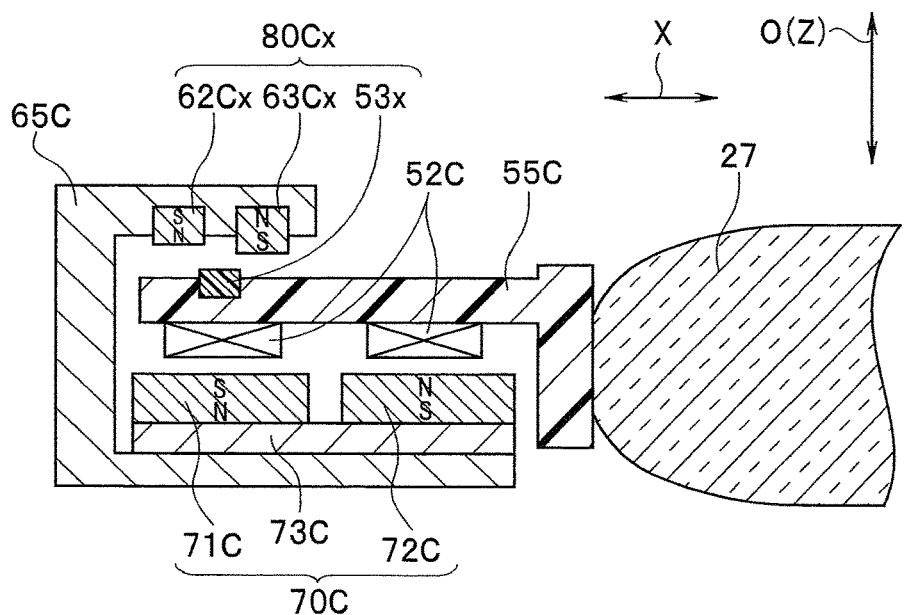
FIG. 15 is a cross-sectional view of enlarged main portions showing a third modification of the image stabilization device of the one embodiment of the present invention.

FIG. 15 is a cross-sectional view of enlarged main portions showing a third modification of the image stabilization device of the one embodiment of the present invention. FIG. 15 also corresponds to FIG. 9 in the one embodiment described above. Further, in FIG. 15 also, only an X-direction position detection unit (80Cx) is shown, and a Y-direction position detection unit is omitted on the assumption that the Y-direction position detection unit is configured substantially similarly to the X-direction position detection unit. In the description below, only the X-direction position detection unit (80Cx) will be described.

In the third modification, an example is shown in which the form of the magnetic circuit units (70C) is different in comparison with the one embodiment described above. That is, in the one embodiment described above, magnet circuit units each of which has a cross formed in a substantially E shape are used as the magnetic circuit units 70 (see FIG. 9 and the like). In comparison, as for a magnetic circuit units 70C, driving coils 52C are arranged on a movable portion body 55C in the direction orthogonal to the optical axis O as shown in FIG. 15. In accordance with this, a configuration is made in which two driving magnets 71C, 72C are arranged via a yoke 73C on a fixed portion body 65C, at positions facing the driving coils 52C, respectively.

In such a configuration, the X-direction position detection unit 80Cx is configured with paired position detection magnets 62Cx, 63Cx and the hall element 53x. The paired position detection magnets 62Cx, 63Cx (referred to as a first magnet 62Cx and a second magnet 63Cx) between the above are formed in rectangular parallelepiped shapes that are different only in length in the direction along the optical axis O.

That is, the first magnet 62Cx, one of the paired position detection magnets, is formed so that a distance to the surface of the hall element 53x is longer than that of the second magnet 63Cx, the other position detection magnet. Thereby, the configuration is made such that magnetic force of the second magnet 63Cx is larger than magnetic force of the first magnet 62Cx, and, therefore, the configuration is made such that strengths of densities of magnetic fluxes reaching the surface of the hall element 53x from the respective magnets are caused to be mutually different. Even when such a configuration is adopted, an advantageous effect similar to the advantageous effect of the one embodiment described above can be obtained.

Fourth Modification

Figure 16:
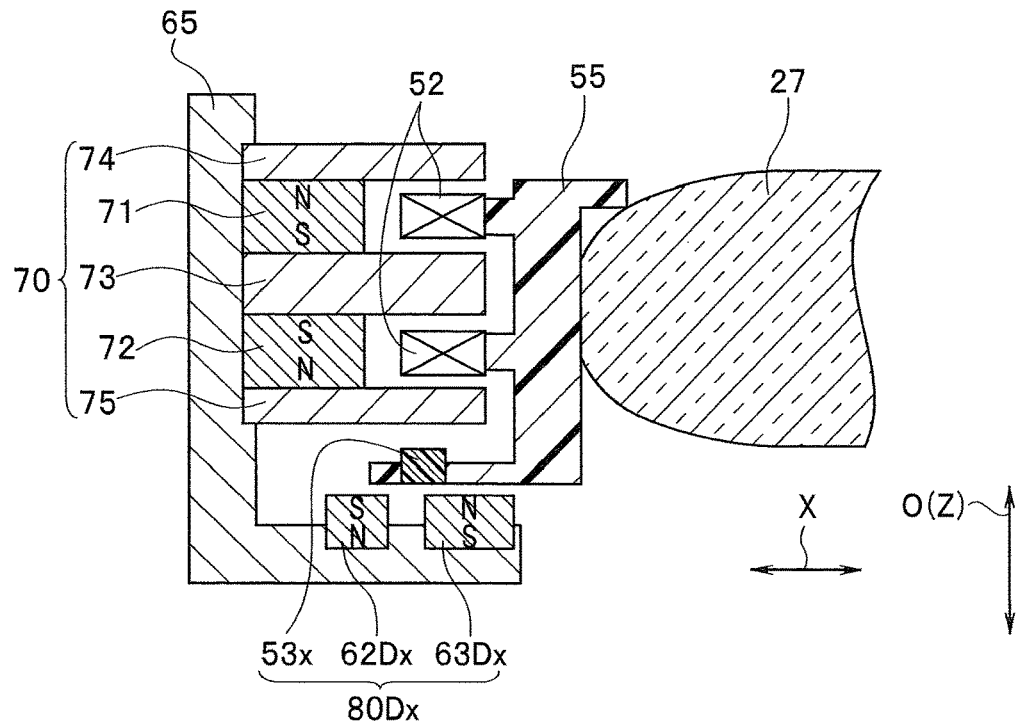
FIG. 16 is a cross-sectional view of enlarged main portions showing a fourth modification of the image stabilization device of the one embodiment of the present invention.

FIG. 16 is a cross-sectional view of enlarged main portions showing a fourth modification of the image stabilization device of the one embodiment of the present invention. FIG. 16 also corresponds to FIG. 9 in the one embodiment described above. Further, in FIG. 16 also, only an X-direction position detection unit (80Dx) is shown, and a Y-direction position detection unit is omitted on the assumption that the Y-direction position detection unit is configured substantially similarly to the X-direction position detection unit. In the description below, only the X-direction position detection unit (80Dx) will be described.

In the fourth modification, the X-direction position detection unit 80Dx is configured with paired position detection magnets 62Dx, 63Dx and the hall element 53x. Both of the paired position detection magnets 62Dx, 63Dx (referred to as a first magnet 62Dx and a second magnet 63Dx) between the above are formed in rectangular parallelepiped shapes and are different only in length in a direction orthogonal the optical axis O. In this case, a magnet with a shorter length in the direction orthogonal to the optical axis O is used for the first magnet 62Dx than for the second magnets 63Dx.

In other words,
when the length of the first magnet 62Dx in the direction orthogonal to the optical axis is indicated by reference symbol R1, and
the length of the second magnet 63Dx in the direction orthogonal to the optical axis is indicated by reference symbol R2 (see FIG. 15),
a configuration is made such that $$R1 < R2$$

is satisfied. Further, in this case, when $$R2/R1 = R$$

is satisfied, it is desirable to make setting so that $$1 < R \leq R2$$

is satisfied.

More specifically, for example, when the length R1 of the first magnet 62Dx=2.0 mm, and the length R2 of the second magnet 63Dx=2.5 mm, $$R = 2.5 \text{ [mm]}/2.0 \text{ [mm]} = 1.25$$

is satisfied, and the above condition "$1 < R \leq 2$" is satisfied.

By this configuration, a configuration can be made so that magnetic force of the first magnet 62Dx<magnetic force of the second magnet 63Dx
is satisfied. Therefore, thereby, a configuration is made such that strengths of densities of magnetic fluxes reaching the surface of the hall element 53x from the respective magnets are mutually different.

Even when such a configuration is adopted, an advantageous effect similar to the advantageous effect of the one embodiment described above can be obtained.

Fifth Modification

Figure 17:
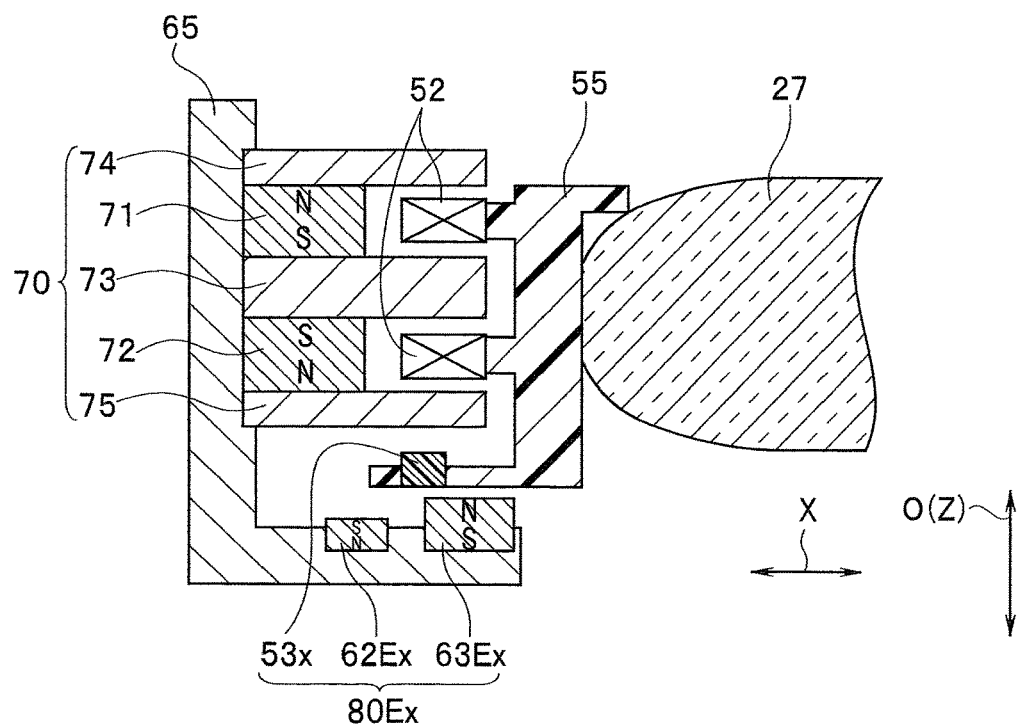
FIG. 17 is a cross-sectional view of enlarged main portions showing a fifth modification of the image stabilization device of the one embodiment of the present invention.

FIG. 17 is a cross-sectional view of enlarged main portions showing a fifth modification of the image stabilization device of the one embodiment of the present invention. FIG. 17 also corresponds to FIG. 9 in the one embodiment described above. Further, in FIG. 17 also, only an X-direction position detection unit (80Ex) is shown, and a Y-direction position detection unit is omitted on the assumption that the Y-direction position detection unit is configured substantially similarly to the X-direction position detection unit. In the description below, only the X-direction position detection unit (80Ex) will be described.

In the fifth modification, the X-direction position detection unit 80Ex is configured with paired position detection magnets 62Ex, 63Ex and the hall element 53x. Both of the paired position detection magnets 62Ex, 63Ex (referred to as a first magnet 62Ex and a second magnet 63Ex) between the above are formed in rectangular parallelepiped shapes and are different in both of length in the direction along the optical axis O and length in the direction orthogonal to the optical axis O.

That is, both of the lengths of the first magnet 62Ex in the direction along the optical axis O and the direction orthogonal to the optical axis O are shorter than the lengths of the second magnet 63Ex. By this configuration, a configuration is made so that magnetic force of the first magnet 62Ex is weaker than magnetic force of the second magnet 63Ex, that is,
magnetic force of the first magnet 62Ex<magnetic force of the second magnet 63Ex
is satisfied. Even when such a configuration is adopted, an advantageous effect similar to the advantageous effect of the one embodiment described above can be obtained.

Sixth Modification

Figure 18:
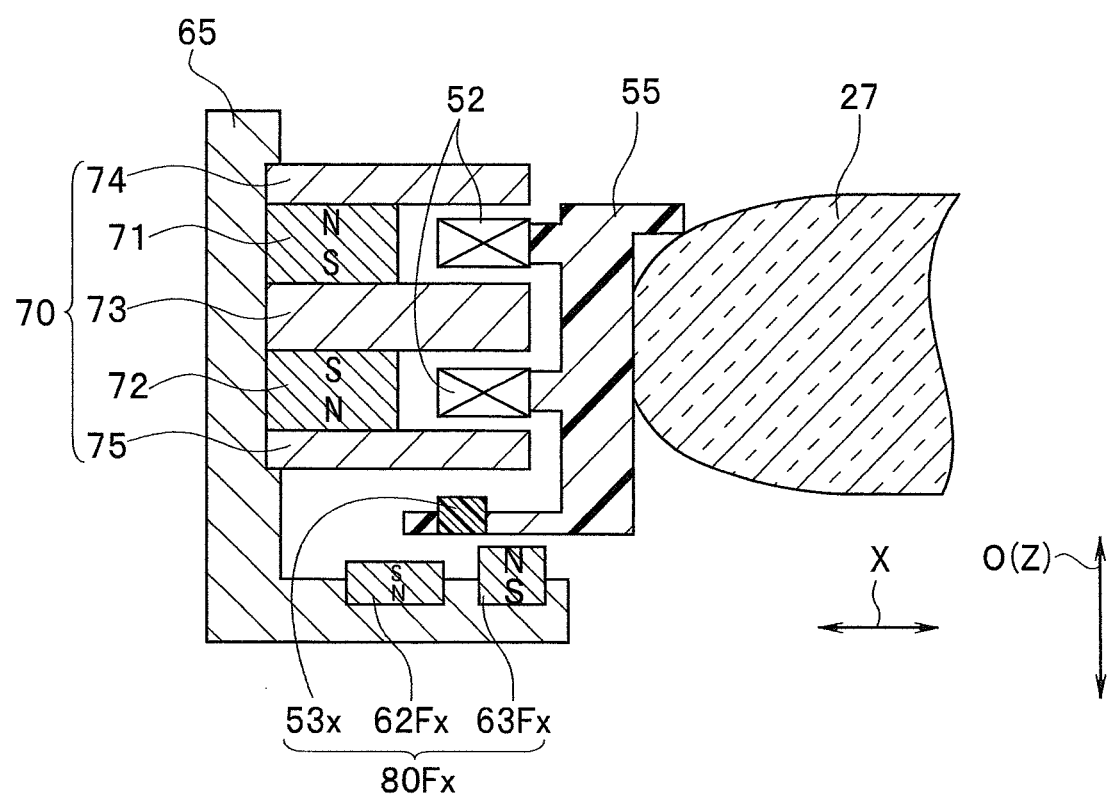
FIG. 18 is a cross-sectional view of enlarged main portions showing a sixth modification of the image stabilization device of the one embodiment of the present invention.

FIG. 18 is a cross-sectional view of enlarged main portions showing a sixth modification of the image stabilization device of the one embodiment of the present invention. FIG. 18 also corresponds to FIG. 9 in the one embodiment described above. Further, in FIG. 18 also, only an X-direction position detection unit (80Fx) is shown, and a Y-direction position detection unit is omitted on the assumption that the Y-direction position detection unit is configured substantially similarly to the X-direction position detection unit. In the description below, only the X-direction position detection unit (80Fx) will be described.

In the sixth modification, the X-direction position detection unit 80Fx is configured with paired position detection magnets 62Fx, 63Fx and the hall element 53x. Both of the paired position detection magnets 62Fx, 63Fx (referred to as a first magnet 62Fx and a second magnet 63Fx) between the above are formed in rectangular parallelepiped shapes and are different in both of length in the direction along the optical axis O and length in the direction orthogonal to the optical axis O.

In this case, in the present modification, the first magnetic 62Fx>the second magnetic 63Fx is satisfied in the length in the direction along the optical axis O, and the first magnetic 62Fx<the second magnetic 63Fx is satisfied in the length in the direction orthogonal to the optical axis O. Even in such a configuration, a configuration is made so that magnetic force of the first magnet 62Fx is weaker than magnetic force of the second magnet 63Fx, that is, magnetic force of the first magnet 62Fx<magnetic force of the second magnet 63Fx is satisfied. Even when such a configuration is adopted, an advantageous effect similar to the advantageous effect of the one embodiment described above can be obtained.

Note that, as for a surface shape of the pair of position detection magnets provided facing the hall element 53x, it is general that the surface is formed with a plane substantially parallel to a facing face of the hall element 53x. However, the surface shape of the pair of position detection magnets is not limited to a planar shape but may be other shapes. For example, the surface of the pair of position detection magnets may be in a form of being inclined relative to the facing face of the hall element 53x. Further, the surface shape of the pair of position detection magnets may be formed in a shape different from a plane, such as a shape having a plurality of uneven parts and a spherical shape.

The present invention is not limited to the embodiment described above, and it is, of course, possible to perform various modifications and applications within a range not departing from the spirit of the invention. Furthermore, the above embodiment includes inventions at various stages, and various inventions can be extracted by appropriately combining a plurality of disclosed constituent features. For example, even if some constituent features are deleted from all constituent features shown in the above embodiment, a configuration obtained after deleting the constituent features can be extracted as an invention if the problem to be solved by the invention can be solved, and the advantageous effect of the invention can be obtained. Furthermore, components of different embodiments may be appropriately combined. The present invention is only limited by accompanying claims and not restricted by a particular practiced aspect of the invention.

The present invention is not limited to an image pickup apparatus which is an electronic apparatus specialized in an image pickup function, such as a digital camera, but can be widely applied to various kinds of electronic apparatuses equipped with the image pickup function in other forms, for example, a movie camera, a mobile phone, a smartphone, a recording apparatus, an electronic notebook, a personal computer, a tablet terminal apparatus, a game machine, a portable TV, a watch, and a navigation apparatus using GPS (global positioning system).

Further, the present invention can be similarly applied to electronic apparatuses having a function of acquiring an image using an image pickup device and displaying the acquired image on a display device, for example, observation apparatuses such as a telescope, a binocular telescope and a microscope.

Furthermore, the present invention can be similarly applied to image pickup apparatuses such as a surveillance camera and an onboard camera in addition to industrial or medical observation apparatuses such as an endoscope and a microscope.

Furthermore, in addition to the above, the present invention can be similarly applied to a projection type image display device and the like configured to enlargingly projecting an image, for example, using a transmission type liquid crystal display device.

What is claimed is:

1. A position detection apparatus configured to detect a position of a movable portion moved relative to a fixed portion, using a voice coil motor (VCM) driving portion, the position detection apparatus comprising:
    a position detection element arranged on one of the movable portion and the fixed portion; and
    a first position detection magnet and a second position detection magnet arranged on another of the movable portion and the fixed portion, the first position detection magnet and the second position detection magnet being aligned so that different magnetic poles face a surface of the position detection element;
    wherein the first position detection magnet and the second position detection magnet are arranged in an order in a moving direction of the movable portion such that magnitudes of densities of magnetic fluxes reaching the surface of the position detection element from the first position detection magnet and the second position detection magnet are different.

2. The position detection apparatus according to claim 1, wherein the second position detection magnet is provided with a function of canceling influence of magnetic force from a neighbor unit.

3. The position detection apparatus according to claim 2, wherein magnetic force of the second position detection magnet is larger than magnetic force of the first position detection magnet.

4. The position detection apparatus according to claim 3, wherein the first position detection magnet and the second position detection magnet are formed in rectangular parallelepiped shapes that are different only in length in a direction along an optical axis.

5. The position detection apparatus according to claim 3, wherein the first position detection magnet and the second position detection magnet are formed in same rectangular parallelepiped shapes with same sizes and formed with different materials.

6. The position detection apparatus according to claim 3, wherein the first position detection magnet and the second position detection magnet are formed in same rectangular parallelepiped shapes with same sizes and arranged at different positions in a direction orthogonal to the moving direction of the movable portion.

7. The position detection apparatus according to claim 3, wherein the first position detection magnet and the second position detection magnet are formed in rectangular parallelepiped shapes that are different only in length in the moving direction of the movable portion.

8. The position detection apparatus according to claim 3, wherein the first position detection magnet and the second position detection magnet are formed in rectangular parallelepiped shapes that are different both in length in the moving direction of the movable portion and length in a direction orthogonal to the moving direction of the movable portion.

\* \* \* \* \*